US009360997B2

(12) United States Patent
Missig et al.

(10) Patent No.: US 9,360,997 B2
(45) Date of Patent: Jun. 7, 2016

(54) CONTENT PRESENTATION AND INTERACTION ACROSS MULTIPLE DISPLAYS

(75) Inventors: Julian K. Missig, Redwood City, CA (US); Jeffrey T. Bernstein, San Francisco, CA (US); Marcelo H. Coelho, Cambridge, MA (US)

(73) Assignee: APPLE INC., Cupertino, CA (US)

( * ) Notice: Subject to any disclaimer, the term of this patent is extended or adjusted under 35 U.S.C. 154(b) by 232 days.

(21) Appl. No.: 13/598,574

(22) Filed: Aug. 29, 2012

(65) Prior Publication Data

US 2014/0068520 A1  Mar. 6, 2014

(51) Int. Cl.
G06F 3/00 (2006.01)
G06F 3/0482 (2013.01)

(52) U.S. Cl.
CPC .................... *G06F 3/0482* (2013.01)

(58) Field of Classification Search
CPC .... H04N 5/4403; G06F 3/01; H04M 2250/16
USPC ................................. 715/740, 841
See application file for complete search history.

(56) References Cited

U.S. PATENT DOCUMENTS

| 5,929,924 A | 7/1999 | Chen |
| 6,442,573 B1 | 8/2002 | Shiller et al. |
| 7,161,619 B1 | 1/2007 | Niida et al. |
| 8,190,688 B2 | 5/2012 | Kortum et al. |
| 8,271,713 B2* | 9/2012 | Grady et al. .................. 710/303 |
| 2005/0275729 A1 | 12/2005 | Billerbeck |
| 2006/0085753 A1* | 4/2006 | Vance et al. .................. 715/753 |
| 2006/0149828 A1 | 7/2006 | Kikinis |
| 2006/0259468 A1 | 11/2006 | Brooks et al. |
| 2007/0011250 A1 | 1/2007 | Kortum et al. |
| 2008/0062141 A1 | 3/2008 | Chandhri |
| 2008/0104516 A1 | 5/2008 | Lee |
| 2008/0109734 A1 | 5/2008 | Castagno |
| 2009/0059093 A1 | 3/2009 | Li et al. |
| 2010/0083338 A1 | 4/2010 | Chiang |
| 2010/0088625 A1* | 4/2010 | Chen ............................. 715/773 |
| 2010/0115455 A1 | 5/2010 | Kim |
| 2010/0203833 A1 | 8/2010 | Dorsey |
| 2010/0250816 A1* | 9/2010 | Collopy et al. ............... 710/303 |

(Continued)

FOREIGN PATENT DOCUMENTS

KR   20020059552    7/2002

OTHER PUBLICATIONS

Microsoft; "Windows Media Player,";Jan. 2004, 212 pages.

(Continued)

*Primary Examiner* — Omar Abdul-Ali
(74) *Attorney, Agent, or Firm* — Morgan, Lewis & Bockius LLP

(57) ABSTRACT

An application can generate multiple user interfaces for display across multiple electronic devices. After the electronic devices establish communication, an application running on at least one of the devices can present a first set of information items on a touch-enabled display of one of the electronic devices. The electronic device can receive a user selection of one of the first set of information items. In response to receiving the user selection, the application can generate a second set of information items for display on the other electronic device. The second set of information items can represent an additional level of information related to the selected information item.

20 Claims, 18 Drawing Sheets

(56) References Cited

U.S. PATENT DOCUMENTS

| | | |
|---|---|---|
| 2010/0265401 A1 | 10/2010 | Yuki |
| 2011/0164184 A1 | 7/2011 | Avkarogullari et al. |
| 2011/0225538 A1 | 9/2011 | Oyagi et al. |
| 2011/0246904 A1* | 10/2011 | Pinto et al. ............. 715/740 |
| 2011/0246912 A1 | 10/2011 | Wiemann et al. |
| 2012/0062688 A1 | 3/2012 | Shen et al. |
| 2012/0240054 A1* | 9/2012 | Webber ............. 715/752 |
| 2012/0254766 A1 | 10/2012 | Lejeune et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0027314 A1 | 1/2013 | Masaki et al. |
| 2013/0047189 A1 | 2/2013 | Raveendran et al. |
| 2013/0089006 A1 | 4/2013 | Huang et al. |
| 2013/0132848 A1 | 5/2013 | Bhatt |
| 2013/0222238 A1* | 8/2013 | Sliger ............. 345/157 |

OTHER PUBLICATIONS

International Search Report and Written Opinion mailed on Jan. 7, 2013, for PCT Patent Application No. PCT/US2012/057598, 10 pages.

Non-Final Office Action mailed on May 10, 2013 for U.S. Appl. No. 13/300,408, filed Nov. 18, 2011, 19 pages.

Fallahkhair, et al., "Dual Device User Interface Design for Ubiquitous Language Learning: Mobile Phone and Interactive Television (iTV)," 2005 IEEE International Workshop on Wireless and Mobile Technologies, 8 pages.

Office action for Australian patent application No. P11299UTM/AU1 mailed Oct. 31, 2012, 4 pages.

International Preliminary Report on Patentability mailed on May 30, 2014, for PCT Patent Application No. PCT/US2012/057598, 6 pages.

\* cited by examiner

FIG. 8
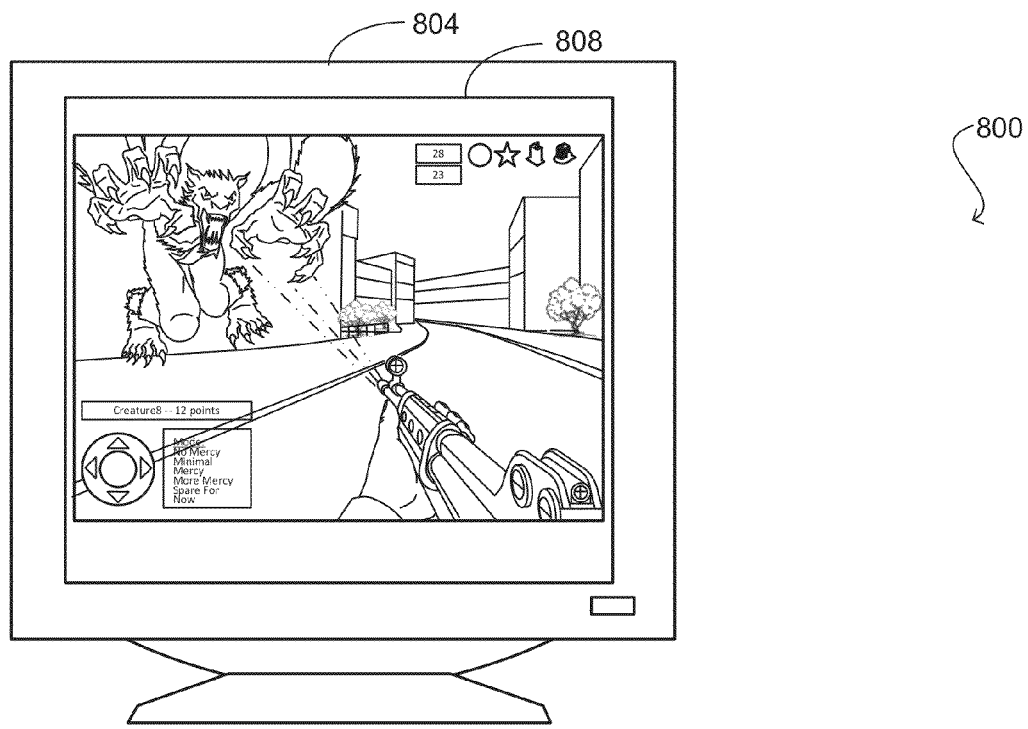
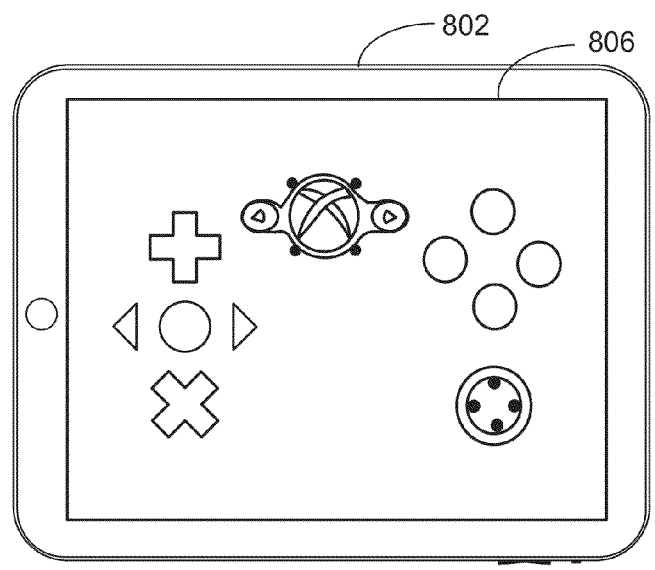

FIG. 10
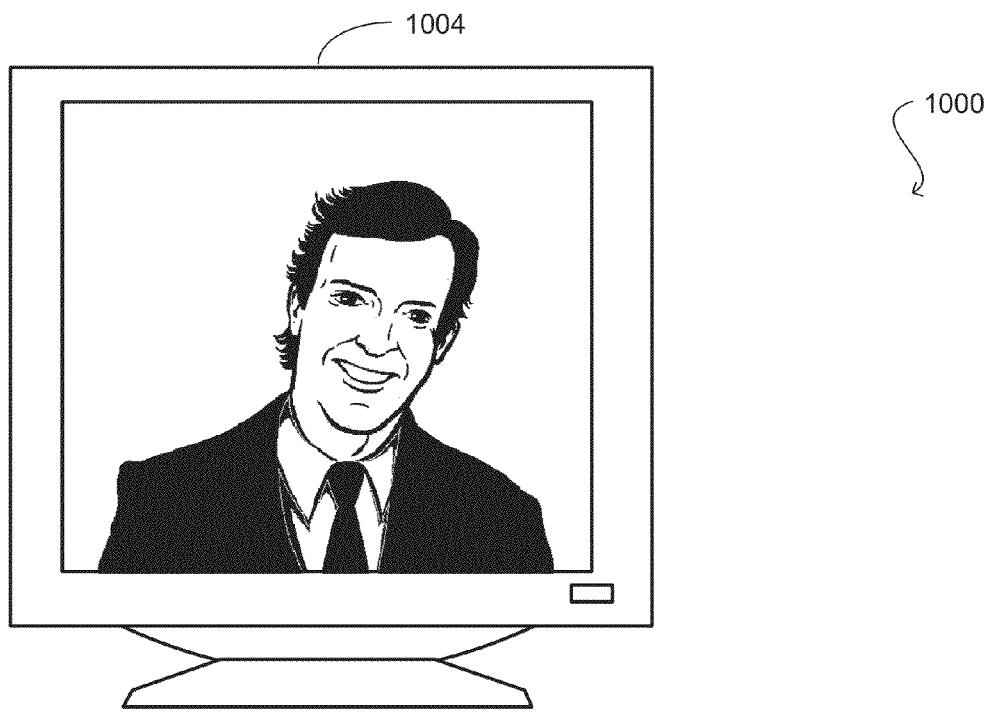
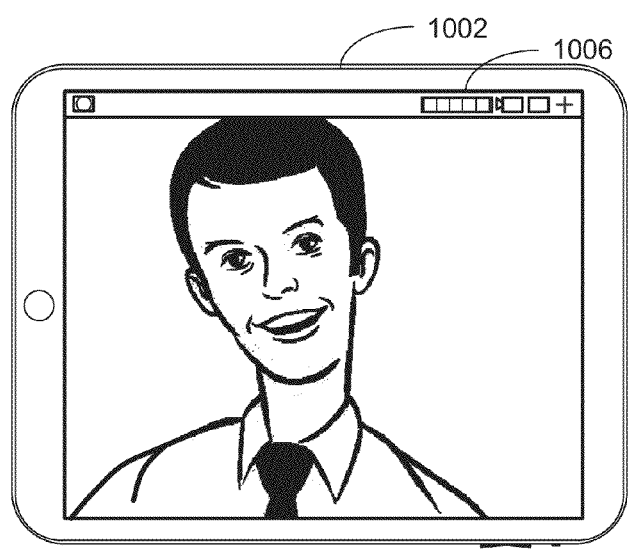

FIG. 11
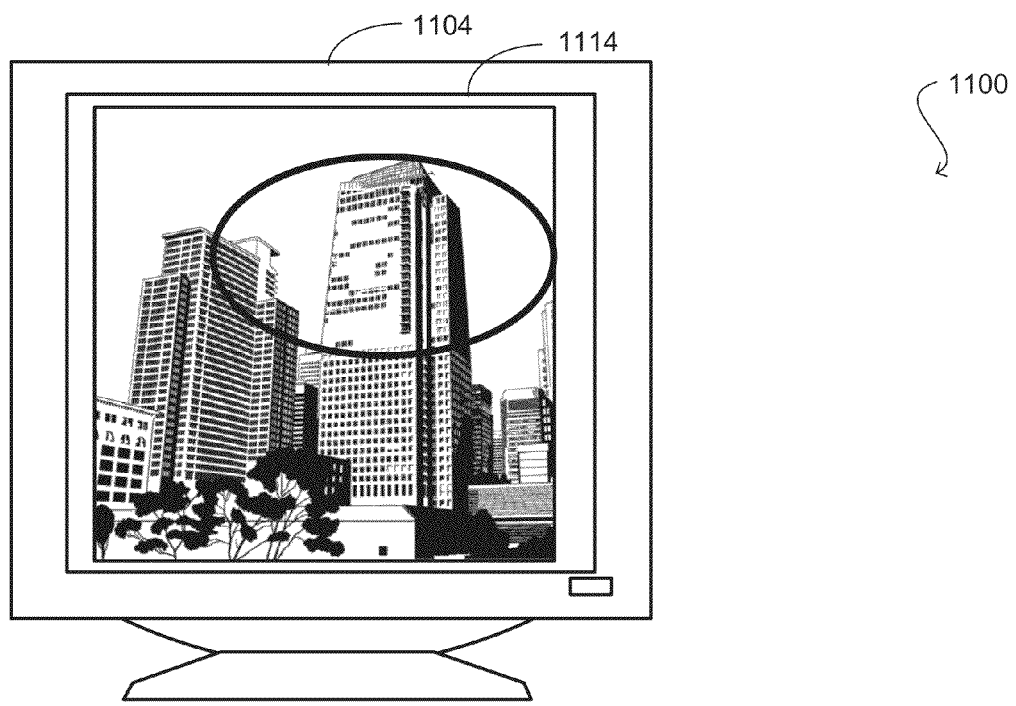
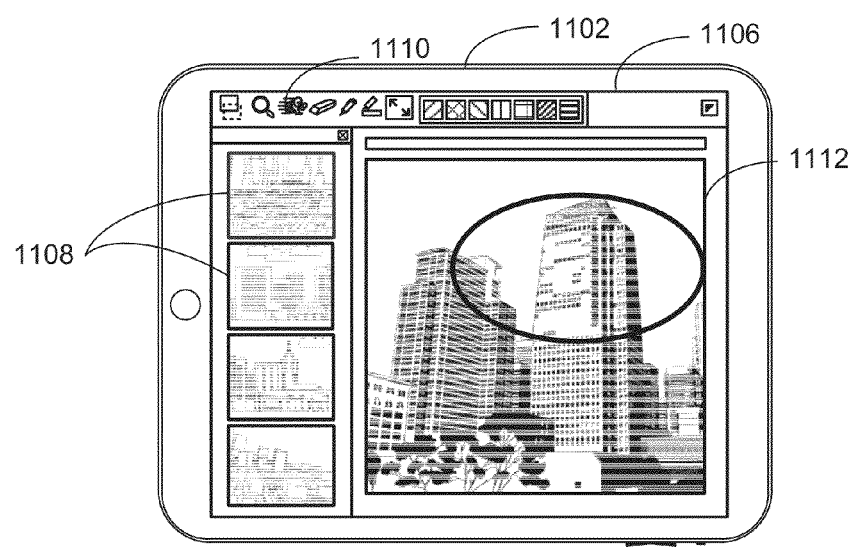

FIG. 12
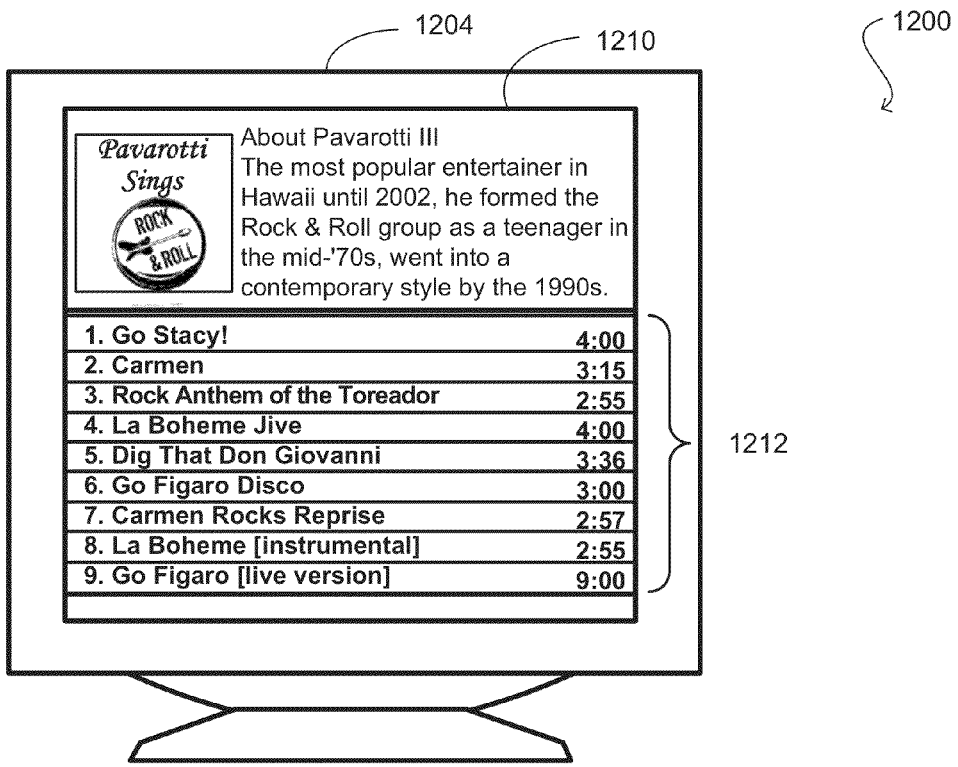
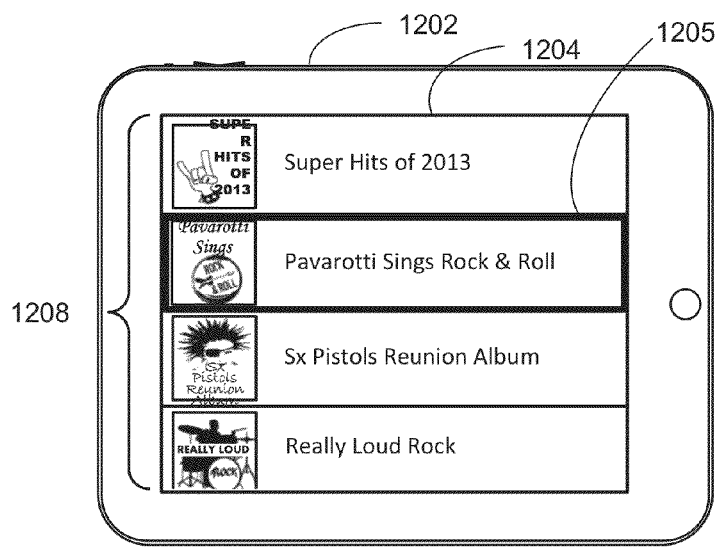

CONTENT PRESENTATION AND INTERACTION ACROSS MULTIPLE DISPLAYS

BACKGROUND

The present disclosure relates in general to presenting information in an electronic environment and in particular to content presentation and manipulation using multiple electronic devices.

As screen real estate becomes increasingly valuable, systems have been developed to use a secondary display screen to either mirror, or provide additional display area to, a primary display screen of a computing device. In the mirroring scenario, what is displayed on a primary display screen of a computing device (e.g., a laptop) may be "mirrored" by a secondary display screen (e.g., attached monitor) that is, for instance, larger and capable of higher-resolution display. In the extension scenario, the secondary display simply provides additional screen real estate but does not "mirror" the content of the primary display. For examples, a user may use the primary display to view one website and use the secondary display to view another website.

However, conventional approaches for using a primary display with a secondary display have shortcomings. First, users have to manually configure the settings of the primary and secondary displays, a process that can confuse and intimidate a significant number of users. Second, even for users who are capable of performing such configuration, the process is time-consuming, inefficient, and irritating to the users' overall computing experience. Third, even technically savvy users may fail to discover display arrangements and/or settings that would maximize the advantage of having two displays.

SUMMARY

Certain embodiments of the present invention relate to content presentation across multiple electronic devices. In some embodiments, content of a software application can be presented across the displays of multiple electronic devices in an intuitive and coordinated fashion. User interfaces displayed by the displays of the electronic devices may represent different aspects or different levels of a set of information items in the software application. In response to receiving a user input via a user interface of an electronic device, another user interface of another electronic device may be modified based on the user input. For example, a tablet computer may display a user interface including a list of songs for a media player application and a desktop monitor may display another, distinct user interface including detailed information for a particular song from the list, in response to a user selection of the particular song via the user interface.

Certain embodiments of the present invention enable coordinated interaction and presentation across a touch device and a non-touch device. A touch device (also referred to as touchscreen device) can be any electronic device that can receive user input via a touchscreen or a display of the device, such as a tablet computer or a smartphone. A non-touch device (also referred to as display device) can be any electronic device that cannot receive user input directly through a display coupled to the device, such as a conventional light emitting diode (LED) computer monitor or a liquid crystal display (LCD) television screen. In some embodiments, a touch device can establish a connection with a non-touch device. At least one of the devices can execute an application where content of the application may be presented across the displays of the devices. A set of user-selectable user interface items can be displayed on the touch-enabled display of the touch device. The electronic device can receive a user selection of one of the set of user interface items displayed on the touch-enabled display. In response to receiving the user selection, another set of information items can be presented on the non-touch device. In some embodiments, the other set of information items represents an additional level of information related to the selected user interface item.

The following detailed description together with the accompanying drawings will provide a better understanding of the nature and advantages of the present invention.

BRIEF DESCRIPTION OF THE DRAWINGS

FIGS. 7-17B illustrate examples of user interfaces generated for display across a touch-enabled display of a portable electronic device and a non-touch display of an electronic device.

DETAILED DESCRIPTION

Figure 1:
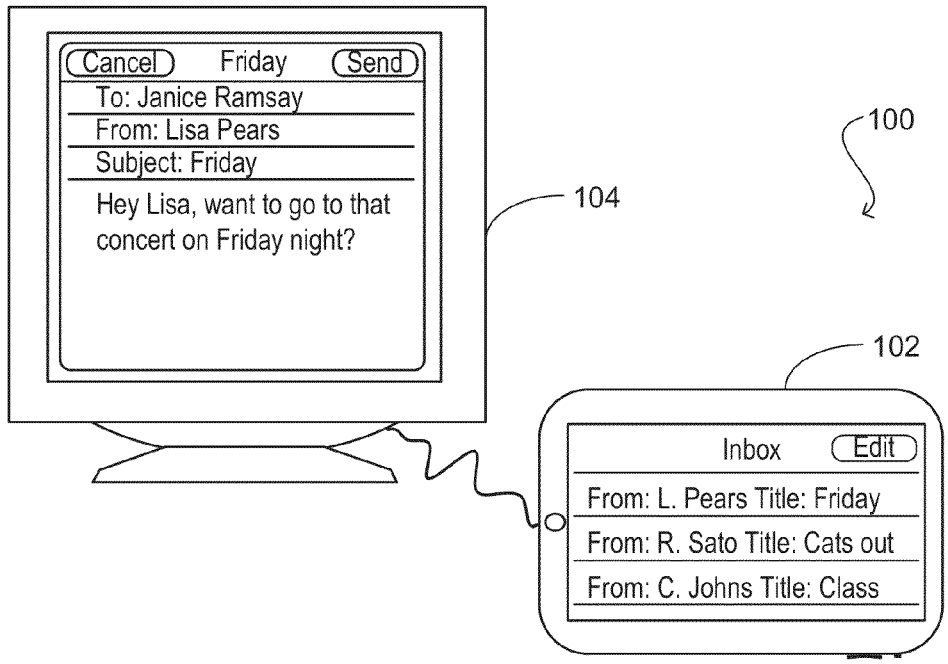
FIG. 1 illustrates an example of a system according to some embodiments of the present invention.

In the following description, for the purposes of explanation, numerous details are set forth in order to provide an understanding of various embodiments of the present invention. It will be apparent, however, to one skilled in the art that certain embodiments can be practiced without some of these details.

Certain embodiments of the present invention relate to content presentation across multiple electronic devices. In some embodiments, content of a software application can be presented across the displays of multiple electronic devices in an intuitive and coordinated fashion. User interfaces displayed by the displays of the electronic devices may represent different aspects or different levels of a set of information items in the software application. In response to receiving a user input via a user interface of an electronic device, another user interface of another electronic device may be modified based on the user input. For example, a tablet computer may display a user interface including a list of songs for a media player application and a desktop monitor may display another, distinct user interface including detailed information for a particular song from the list, in response to a user selection of the particular song via the user interface.

Certain embodiments of the present invention enable coordinated interaction and presentation across a touch device and a non-touch device. A touch device (also referred to as touchscreen device) can be any electronic device that can receive user input via a touchscreen or a display of the device, such as a tablet computer or a smartphone. A non-touch device (also referred to as display device) can be any electronic device that cannot receive user input directly through a display coupled to the device, such as a conventional light emitting diode (LED) computer monitor or a liquid crystal display (LCD) television screen. In some embodiments, a touch device can establish a connection with a non-touch device. At least one of the devices can execute an application where content of the application may be presented across the displays of the devices. A set of user-selectable user interface items can be displayed on the touch-enabled display of the touch device. The electronic device can receive a user selection of one of the set of user interface items displayed on the touch-enabled display. In response to receiving the user selection, another set of information items can be presented on the non-touch device. In some embodiments, the other set of information items represents an additional level of information related to the selected user interface item.

Generating and presenting different levels of information across multiple electronic devices and in a display arrangement intuitive to a user can enhance the user's experience. For example, the overall user experience can be optimized by coordinating and presenting information items associated with an application across the different devices in a way that maximizes use of a display device with a large display area and a smaller touchscreen device.

FIG. 1 illustrates an example of a system environment 100 according to some embodiments of the present invention. System environment 100 includes a touchscreen device 102 communicatively coupled to a display device 104. Touchscreen device 102 can be an electronic device that is capable of sending and receiving content, and displaying a visual representation of the content on a display of the device. For example, touchscreen device 102 can be a tablet computer, a smartphone, a mobile phone, etc. In some embodiments, touchscreen device 102 can have a user interface that includes user input and/or output devices such as a touchscreen 106. Touchscreen device 102 can also include any number of other user input and/or output devices such as buttons, virtual or physical keyboards, microphones, speakers, and the like. In some embodiments, touchscreen device 102 can receive user input through its display via hand gestures (i.e., with or without the user physically touching the display).

Display device 104 can be an electronic device capable of sending, receiving, and displaying content. Display device 104 can be a desktop computer, a laptop computer, a monitor, a tablet computer, a mobile phone, etc. In some embodiments, display device 104 can include a non-touch display. In other embodiments, display device 104 can have a touch-enabled display. Display device 104 can also include a number of input and/or output devices such as keyboards, speakers, microphones, etc.

As shown in this example, touchscreen device 102 and display device 104 can simultaneously display multiple, distinct user interfaces for a single software application on each of their display devices. An application executing on one of the two devices can generate a user interface for display on the local device and generate another user interface for display on the other device. In one embodiment, the user interfaces generated can be mirror images of each other or partial-mirror images. In some embodiments, one of the user interfaces may include a set of information items and the other user interface may include another set of information items that includes a different abstraction level compared to the first set. Some embodiments allow one of the user interfaces to include a set of controls that can control or modify content displayed on the other user interface.

In response to receiving user input via the user interface on touchscreen device 102, the application in some embodiments can modify the content of the user interface being displayed on display device 104. For example, an e-mail application executing on touchscreen device 102 can cause both touchscreen device 102 and display device 104 to display a set of e-mails in an inbox. In response to receiving a user selection of a particular e-mail from the set of e-mails displayed on the touch-enabled display of touchscreen device 102, the e-mail application may cause display device 104 to display the contents of the particular e-mail while a view of the list of e-mails is maintained on touchscreen device 102. As such, the user can select any e-mail from the list of e-mails displayed on touchscreen device 102 while simultaneously viewing the contents of the selected e-mail on display device 104. The application can generate different user interfaces to be displayed across devices 102 and 104 in a coordinated fashion and in response to user input received via the user interface on touchscreen device 102.

Figure 2:
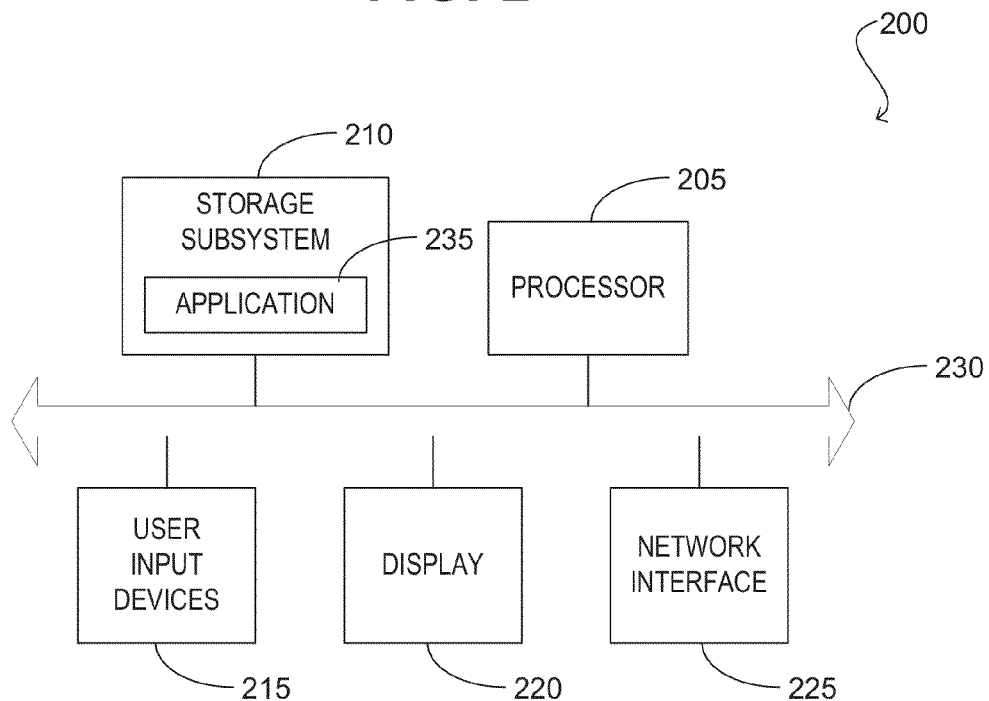
FIG. 2 illustrates a computer system according to an embodiment of the present invention.

FIG. 2 illustrates a computer system 200 according to an embodiment of the present invention. Computer system 200 can be implemented as any of various computing devices, including, e.g., a desktop or laptop computer, tablet computer, smart phone, personal data assistant (PDA), or any other type of computing device, not limited to any particular form factor. Portable electronic device 102 and electronic device 104 of FIG. 1 can include similar components as those shown in computer system 200. Computer system 200 can include processing unit(s) 205, storage subsystem 210, input devices 215, display 220, network interface 225, and bus 230.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like. In some embodiments, some or all processing units 205 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 205 can execute instructions stored in storage subsystem 210.

Storage subsystem 210 can include various memory units such as a system memory, a read-only memory (ROM), and a permanent storage device. The ROM can store static data and instructions that are needed by processing unit(s) 205 and other modules of electronic device 200. The permanent storage device can be a read-and-write memory device. This permanent storage device can be a non-volatile memory unit that stores instructions and data even when computer system 200 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 210 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 210 can include removable storage media that can be readable and/or writeable; examples of such media include compact disc (CD), read-only digital versatile disc (e.g., DVD-ROM, dual-layer DVD- ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 210 can store one or more software programs to be executed by processing unit(s) 205, such as an application 235. "Software" refers generally to sequences of instructions that, when executed by processing unit(s) 205 cause computer system 200 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 210, processing unit(s) 205 can retrieve program instructions to execute and data to process in order to execute various operations described herein.

A user interface can be provided by one or more user input devices 215, display device 220, and/or and one or more other user output devices (not shown). Input devices 215 can include any device via which a user can provide signals to computing system 200; computing system 200 can interpret the signals as indicative of particular user requests or information. In various embodiments, input devices 215 can include any or all of a keyboard, touch pad, touch screen, mouse or other pointing device, scroll wheel, click wheel, dial, button, switch, keypad, microphone, and so on.

Display 220 can display images generated by electronic device 200 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 220. Examples include indicator lights, speakers, tactile "display" devices, printers, and so on.

In some embodiments, the user interface can provide a graphical user interface, in which visible image elements in certain areas of display 220 are defined as active elements or control elements that the user selects using user input devices 215. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular area in display 220. Other user interfaces can also be implemented.

Network interface 225 can provide voice and/or data communication capability for electronic device 200. In some embodiments, network interface 225 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof)), GPS receiver components, and/or other components. In some embodiments, network interface 225 can provide wired network connectivity (e.g., Ethernet) in addition to or instead of a wireless interface. Network interface 225 can be implemented using a combination of hardware (e.g., antennas, modulators/demodulators, encoders/decoders, and other analog and/or digital signal processing circuits) and software components. In some embodiments, network interface 225 can provide electronic device 200 an interface to other computer systems, devices, and networks. For example, network interface 225 can enable electronic device 200 (e.g., a touchscreen device such as touchscreen device 102 of FIG. 1, a display device such as display device 104 of FIG. 1) to connect to one or more devices (e.g., a touchscreen device or a display device) via a wired connection (e.g., via a USB) or a wireless network (e.g., Bluetooth®).

Bus 230 can include various system, peripheral, and chipset buses that communicatively connect the numerous internal devices of electronic device 200. For example, bus 230 can communicatively couple processing unit(s) 205 with storage subsystem 210. Bus 230 also connects to input devices 215 and display 220. Bus 230 also couples electronic device 200 to a network through network interface 225. In this manner, electronic device 200 can be a part of a network of multiple computer systems (e.g., a local area network (LAN), a wide area network (WAN), an Intranet, or a network of networks, such as the Internet. Any or all components of electronic device 200 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 205 can provide various functionality for electronic device 200. For example, processing unit(s) 205 can execute an application 235 that is configured to generate multiple application user interfaces for presentation on multiple display devices. Examples of applications that can be stored and executed in storage subsystem 210 include productivity applications (e.g., e-mail applications, word processing applications, presentation creation application, etc.), multi-media applications (e.g., media-editing applications, media player applications, etc.), browser applications, video game applications, or any other type of software application that can be operated via a user interface.

In some embodiments, application 235 can generate a first user interface configured to be presented on display 220. Application 235 can further generate a second user interface configured to be presented on another display of another electronic device that is in communication with computer system 200 (e.g., via wired or wireless communication link). In some embodiments, application 235 can be configured to receive user commands for interacting with at least one of the first or second user interfaces (e.g., via user input devices 215 and/or user input devices of the other electronic device) and process the user commands using processor 205.

Application 235 can generate multiple user interfaces that include a different set of information items (e.g., a partial mirroring, a lower or higher level of abstraction) for display on the multiple displays. In some embodiments, application 235 generates the user interfaces for each display in a way that would present content to the user in an intuitive manner and that would provide better use of screen space across the available displays. For instance, an instant messaging application may generate a soft or virtual keyboard for display on the touch-enabled display of a smartphone. In addition, the application may generate a user interface that shows a text box with characters being entered by the user (e.g., via the soft keyboard), along with the conversation exchange between the user and a participant, for display on a monitor. In some embodiments, the user interfaces generated by application 235 can be interactive, such that user input received with respect to one of the user interfaces can affect the display of another user interface. Further, user input received with respect to one of the user interfaces can be used to control or interact with application 235 in some embodiments.

It will be appreciated that computer system 200 is illustrative and that variations and modifications are possible. Computer system 200 can have other capabilities not specifically described here (e.g., mobile phone, global positioning system (GPS), power management, one or more cameras, various connection ports for connecting external devices or accessories, etc.). Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
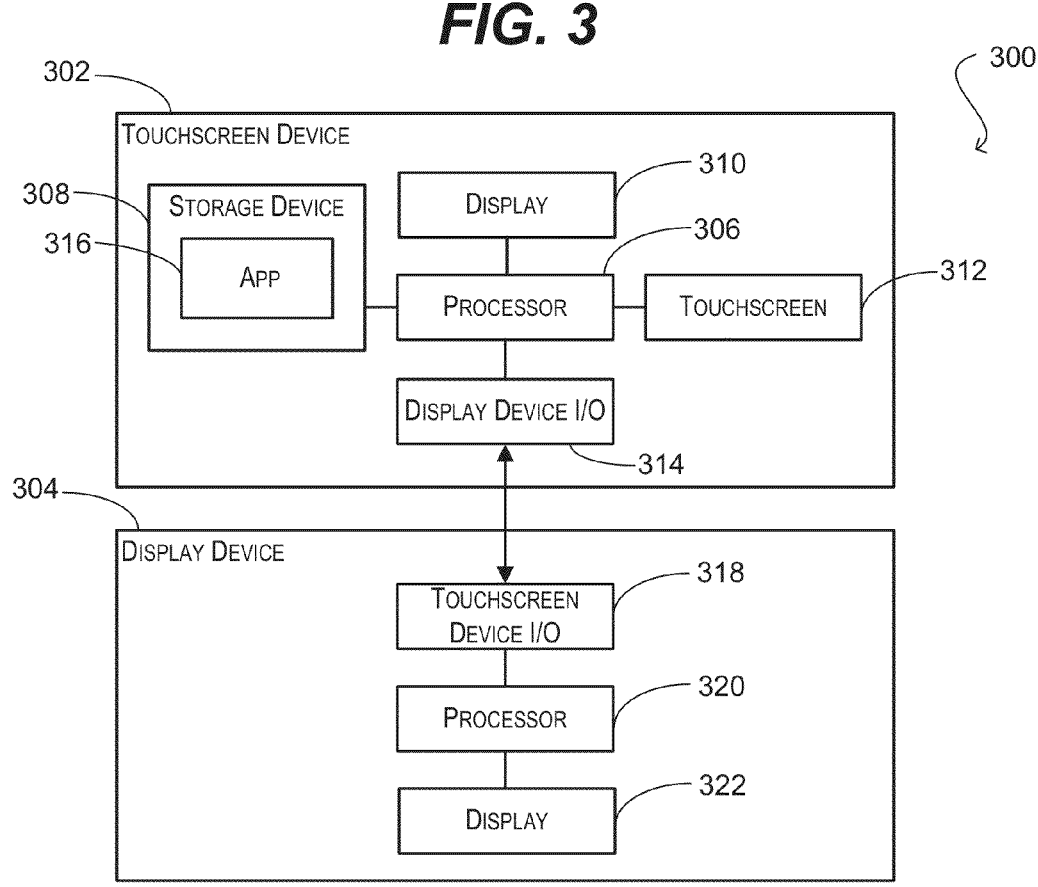
FIG. 3 illustrates a simplified block diagram of a system similar to FIG. 1 in accordance with some embodiments of the present invention.

FIG. 3 illustrates a simplified block diagram of a system 300 in accordance with some embodiments of the present invention. System 300 includes a touchscreen device 302 (e.g., similar to touchscreen device 102 of FIG. 1) and display device 304 (e.g., similar to display device 104 of FIG. 1). Specifically, touchscreen device 302 may be a tablet computer and display device 304 may be a computer monitor in this example.

Touchscreen device 302 can include a processor 320 (e.g., similar to processor 205 of FIG. 2), a storage device 308 (e.g., similar to storage subsystem 210 of FIG. 2), a display 310 (e.g., similar to display 220 of FIG. 2), touchscreen device 312 (e.g., similar to user input devices 215 of FIG. 2), and a display device input/output interface 314 (e.g., similar to network interface 225 of FIG. 2). Although not shown, touchscreen device 302 can include other components to provide various capabilities. For example, in some embodiments, touchscreen device 302 can include transceiver components for wireless voice and/or data networks, a GPS receiver, and/or other components.

As described above, processor 320 can send and receive data or execute various application programs stored in storage device 308. Processor 320 can also manage communication with other electronic devices (e.g., display device 304) via input/output (I/O) interface 314. As described in further detail below, in one embodiment, processor 320 can execute a program application 316 such as an e-mail application for composing messages to others, an instant messaging application, a media player application for playing media assets and/or navigating a media asset database, a video gaming application, a presentation application, a map application for providing directions, a web browser application for browsing the Internet, a video conferencing application, a photograph manipulation software application, etc. Further, in some embodiments, storage device 208 can store media assets such as audio, video, still images, or the like, and associated metadata (e.g., asset name, artist, title, genre, playlists, etc.). Storage device 208 can also store a user's address book information including a user's contacts (names, addresses, phone numbers, etc.); a user's calendar information such as scheduled appointments and events; notes; and/or other personal information.

In this example, touchscreen device 302 can be a tablet device that incorporates a touchscreen 312 configured to perform the functions of a keyboard/mouse. Touchscreen device 302 can include additional devices that allow a user to interact with touchscreen device 302, as described with respect to user input devices 215 of FIG. 2. In some embodiments, the user can operate a touchscreen 312 to interact with content displayed on touchscreen device 302 and display device 304. Display 310 can be an integral part of touchscreen device 302, such as an embedded LCD or OLED panel. Like display 310, touchscreen 312 can be a touch-based interface that is integrated into a display screen or other surface of touchscreen device 302. Similar to network interface 225 of FIG. 2, device I/O interface 314 can serve as an interface for communicating data between touchscreen device 302 and other devices or networks. In various embodiments, device I/O interface 314 can be a wired (e.g., twisted pair Ethernet, USB, etc.) or wireless (e.g., WiFi, cellular, etc.) interface.

Display device 304 can include a processor 320, a display 322, and a touchscreen device I/O interface 318. Display device 304 is representative of a broad range of electronic devices to which touchscreen device 302 can be connected, and it is understood that such devices can vary widely in capability, complexity and form factor. Specifically, display device 304 in this example can be representative of a computer monitor coupled to touchscreen device 302 (e.g., a tablet computer). Various electronic devices may include components not shown in FIG. 3, including but not limited to storage devices (disk, memory, etc.), ports for connecting to external speakers and/or display devices, user input devices, additional output devices, and so on.

Processor 320 can be implemented as one or more integrated circuits, such as a microprocessor or microcontroller. In various embodiments, processor 320 can execute program code to perform various functions associated with display device 304. For example, in some embodiments where display device 304 incorporates a sound system (e.g., speaker system), program code executed by processor 320 can include programs for digital audio decoding, analog or digital audio processing, and the like. Processor 320 can also manage communication with touchscreen devices (e.g., touchscreen device 302) via I/O interface 318.

Display 322 can be any type of device capable of receiving information (e.g., display signals) from display device 304 and outputting the received information on a screen or other output interface to a user. In one set of embodiments, display device 304 can be a computer monitor and display 322 is an integral part of display device 304, such as an embedded LCD or OLED panel. In some embodiments, display 322 can include an audio output device for presenting audio (in addition to images and video) to a user. Alternatively, display device 304 can be a computer desktop and display 322 can be external to display device 304. For instance, display 322 can be a computer monitor, a television, or some other type of standalone display that is in wired or wireless communication with display device 304.

Touchscreen device I/O interface 318 can include a number of signal paths configured to carry various signals between display device 304 and touchscreen device 302. In one set of embodiments, touchscreen device I/O interface 318 includes a connector or a wireless interface (e.g., Bluetooth or the like).

It should be appreciated that system 300 is illustrative and not intended to limit embodiments of the present invention. For example, touchscreen device 302 and display device 304 may each have other capabilities or include other components that are not specifically described. One of ordinary skill in the art will recognize many variations, modifications, and alternatives.

Figure 4:
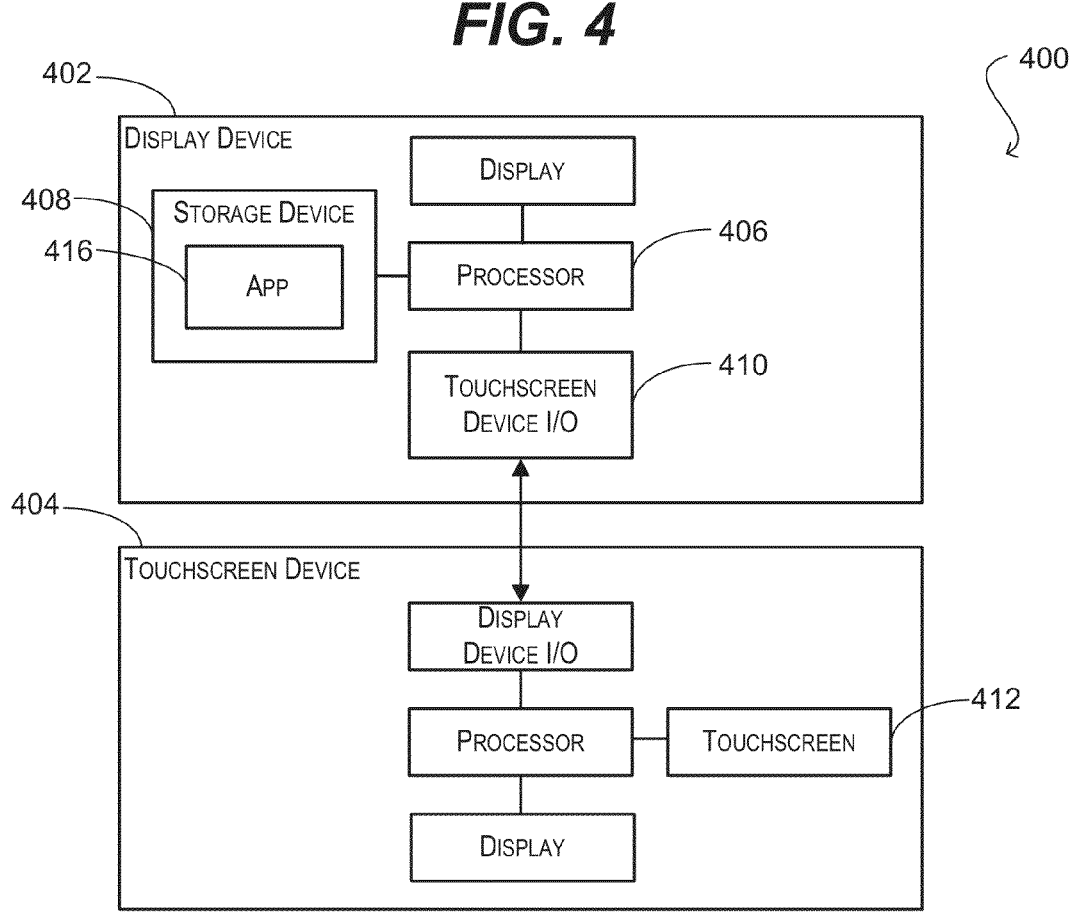
FIG. 4 illustrates another simplified block diagram of a system similar to FIG. 1 in accordance with some embodiments of the present invention.

FIG. 4 illustrates another simplified block diagram of a system 400 in accordance with some embodiments of the present invention. As shown, system 400 includes various components/features that are substantially similar to system 300 of FIG. 3, but application 416 is stored and executed on display device 402 instead of on touchscreen device 404. Electronic device 402 may be a desktop computer in this example, while portable electronic device 404 may be a tablet computer. Portable electronic device 404 still incorporates a touchscreen 412 that is configured to receive user input. Electronic device 402 employs a processor 406 that can carry out one of more functions attributable to electronic device 402, such as executing application 416. Processor 406 can also manage communication with touchscreen device 404.

Figure 5:
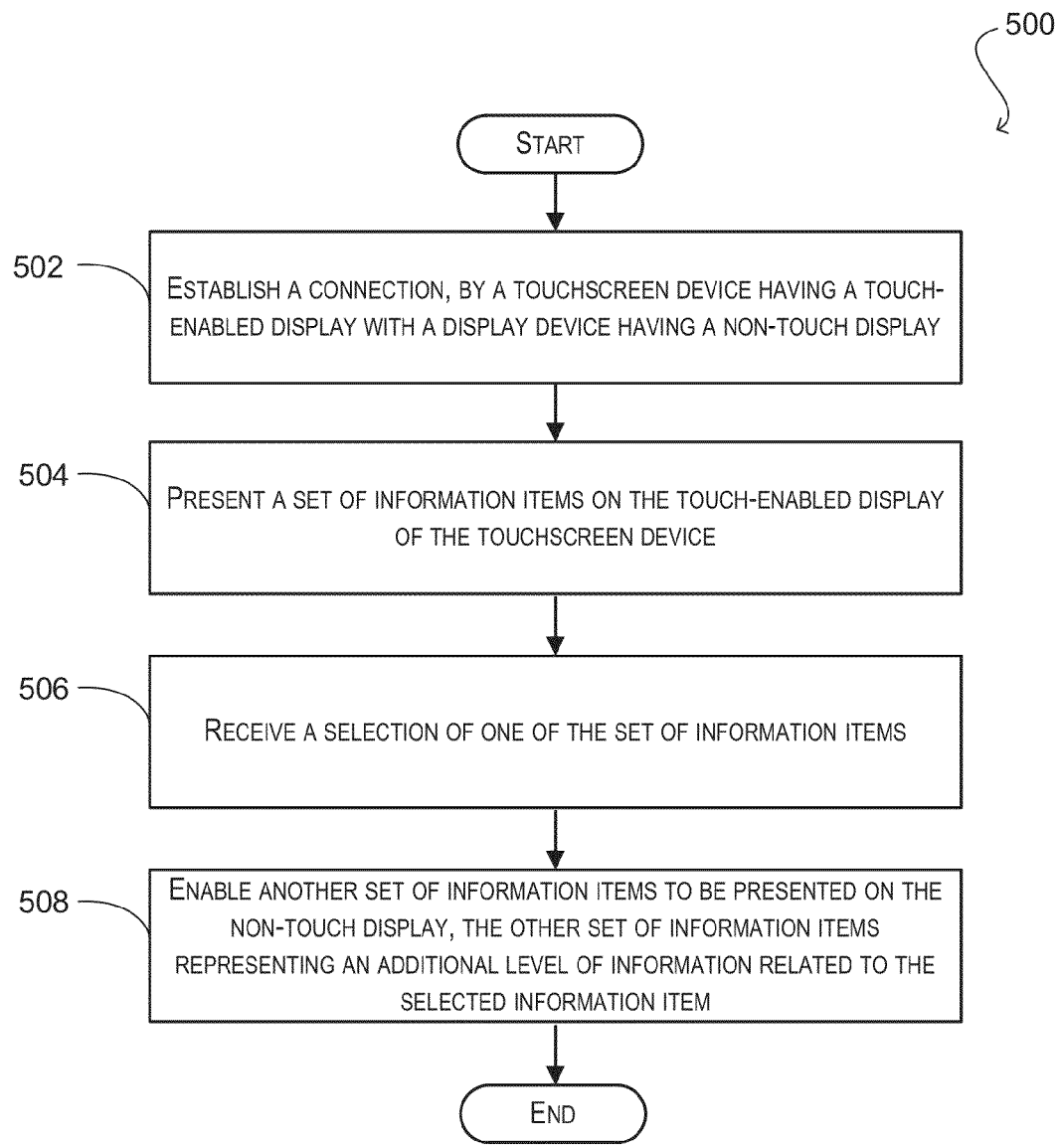
FIG. 5 illustrates an example of a process performed by a touch device for interacting with a non-touch device according to some embodiments of the present invention.

In some embodiments, an application executing on one device can drive the displays of both a touchscreen device and a display device while receiving user input from the touchscreen device. FIG. 5 illustrates an example of a process 500 performed by a touchscreen device (e.g., touchscreen device 102) for interacting with a display device (e.g., display device 104) having a non-touch display according to some embodiments of the present invention.

Process 500 begins when the touchscreen device establishes a connection (at block 502) with the display device. As mentioned, the touchscreen device can be an electronic device such as a tablet computer with a touch-enabled display. The display device can be a desktop computer or a monitor with a non-touch display. In some embodiments, establishing communication between the devices 102 and 104 may include identifying and authenticating display device 104 (and vice versa) using a set of commands. Communication between the devices may be established through a wired (e.g., via a cable) or wireless connection (e.g., via Bluetooth, via near field communication (NFC)).

Process 500 can present (at block 504) a first set of information items on the touch-enabled display of the touchscreen device. In some embodiments, touchscreen device 102 may launch an application when a user indicates the desire to use tools and functionality provided by the application. The application can present a set of information items on the touch-enabled display where the first set of information items is navigable and selectable by a user of the touchscreen device. For example, upon launching a media playing computer program, the touch-enabled display may present a user interface including a list of selectable user interface items representing a set of songs. In another example, a mapping application can present a navigable map where the user can use controls on the display of the portable electronic device to view different aspects or portions of the map.

Process 500 can receive (at block 506) a selection of one of the first set of information items from the user via the touch-enabled display of the touchscreen device. The first set of information items may include a set of selectable user interface items representing a set of songs for a media player application, a set of e-mails for an e-mail client application, a set of controls for a video gaming application, a combination of a set of editing tools and a series of presentation slides, a set of photos, a virtual keyboard, etc. The user may select one or more selectable user interface items via the touchscreen or touch-enabled display of the touchscreen device.

Process 500 can enable (at block 508) a second set of information items associated with the selected information item to be presented on the display of the second electronic device while the first set of information items is presented on the touch-enabled display of the first electronic device. In some embodiments, the second set of information items represents an additional level of information (e.g., a higher level of information, a lower level of information) related to the selected information item. For example, upon receiving user selection of a particular e-mail from a list of e-mails being displayed on the touch-enabled display of touchscreen device 102, the application can cause display device 104 to display a lower level of information including content of the particular e-mail.

In some embodiments, the first set of information items displayed on touchscreen device 102 can include a set of selectable control elements. The user can select at least one of the set of control elements to indicate a change to content of the application. For instance, in an e-mail client application, the user can select a "compose" control element on touchscreen device 102 and view a composition window on other display. Then, when the user types a character, it would appear in the composition window. The user can edit content of an e-mail by performing character input via a virtual keyboard displayed on the user interface of touchscreen device 102. In response to receiving the user input, the application can cause the user interface on display device 104 to display the characters input by the user. In this instance, the second set of information items displayed on display device 104 can represent a higher level of information related to the selected information item (i.e., selectable keys on the virtual keyboard representing characters) by displaying the entirety of the e-mail and the content being inserted.

In some embodiments, the first and second set of information items may be identical or similar. In response to receiving the user selection of an information item, the application may generate another user interface that is a mirror image of the user interface displayed on the touch-enabled display of the first electronic device. In some embodiments, the application may generate a partial mirror-image for display on the display of the second electronic device. For instance, a presentation application may display a set of tools, a set of presentation slides, and an image of the selected slide on the touch-enabled display while causing the display of the second electronic device to display only the selected slide. In response to receiving a selection of the slide, the application can cause display device 104 to present a lower level of information including a zoomed-in view of the slide. In some instances, the application may further cause display device 104 to display additional details about the selected slide.

Figure 6:
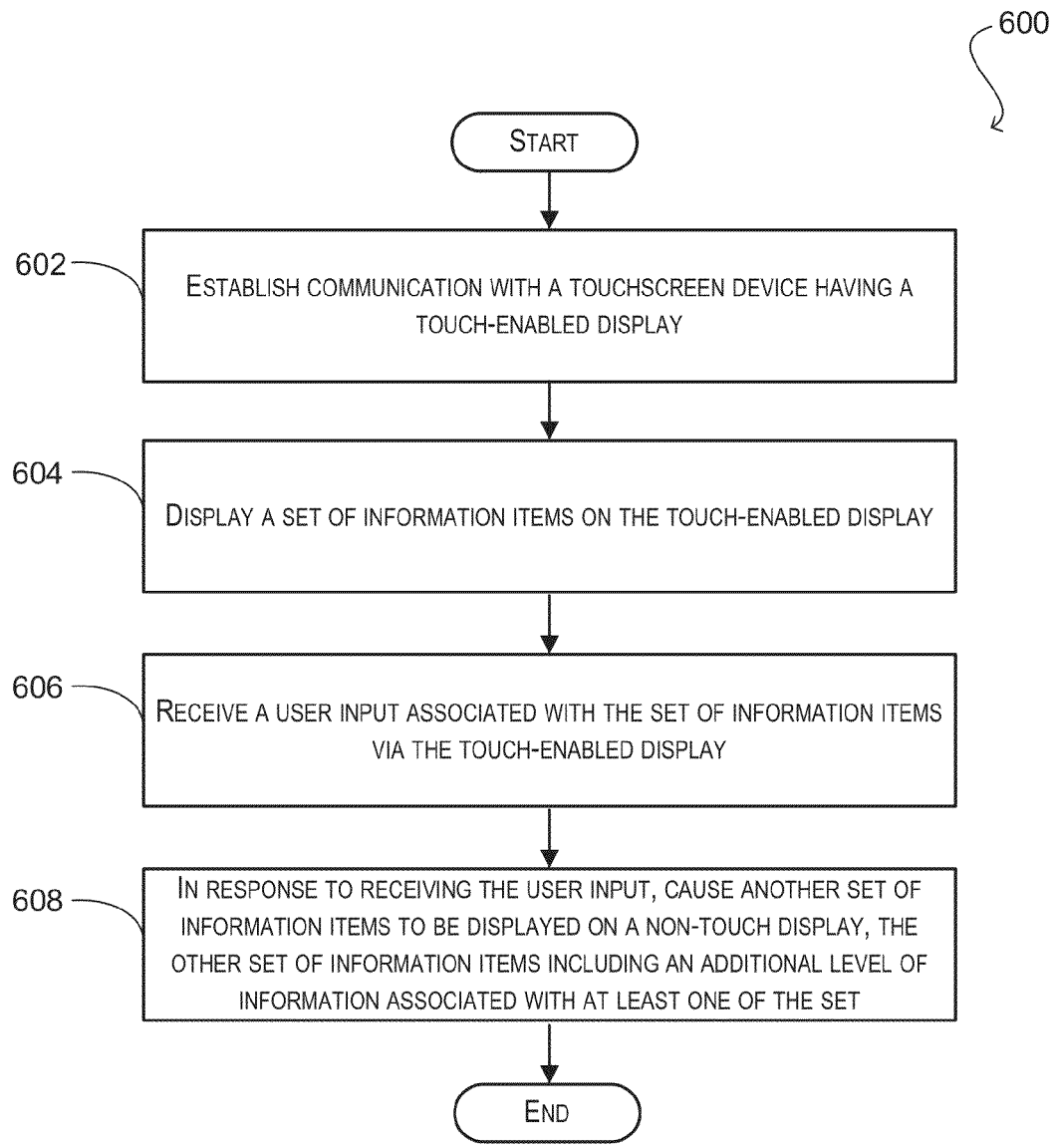
FIG. 6 illustrates an example of a process performed by non-touch device for presenting information across the non-touch device and a touch device in accordance with some embodiments of the invention.

While some embodiments may store and execute the application on touchscreen device 102, the application in some embodiments may be stored and executed on display device 104. Regardless of which device stores and executes the application, the application can generate multiple interactive user interfaces that can be displayed across the multiple devices. FIG. 6 illustrates an example of a process 600 performed by a first electronic device (e.g., electronic device 104) for presenting information across the first electronic device and a second electronic device (e.g., portable electronic device 102) in accordance with some embodiments of the invention.

As described, the application may be executed on a display device (e.g., display device 104 of FIG. 1) while receiving user input from a touchscreen device (e.g., touchscreen device 102 of FIG. 1). Process 600 begins when the touchscreen device and the display device establish communication (at block 602). As described, the devices can establish communication via a wired or wireless connection. Process 600 can send (at block 604) a first set of information items to a touchscreen device with a touch-enabled display. An application being launched on the display device can generate a user interface for display on the display device and another user interface for display on the touch-enabled display of the touchscreen device. Upon generating the other user interface including a set of information items, the application can send the set of information items to the touchscreen device for display.

Process 600 can receive (at block 606) user interaction with the set of information items from the touchscreen device. The user may perform user input via the touch-enabled display of touchscreen device 102. In some embodiments, the user input may indicate a selection of a particular item in the set of information items. For example, the application may cause touchscreen device 102 to display a list of restaurants, a set of media player control elements, or a number of keys of a virtual keyboard. The user may then select a particular restaurant, a particular control element, or a particular key from the list of selectable items displayed.

Process 600 can display (at block 608) another set of information items on a display of the touchscreen device in response to receiving the user interaction. In some embodiments, the other set of information items represents an additional level of information associated with at least one of the set of information items. For example, in response to receiving user selection of a particular restaurant, a restaurant recommendation application may generate a user interface that includes another set of information items (e.g., detailed information about the restaurant, directions to the restaurant, hours, pictures, etc.) and cause the display device to display the user interface including the other set of information items. In another example, in response to receiving user selection of a particular song, a media player application can generate a user interface that includes another set of information items, including album art, frequency characteristics of the particular song, etc., for display on the display device.

It should be appreciated that processes 500 and 600 are illustrative and that variations and modifications are possible. For example, although process 500 indicates that application 215 (executing on either touchscreen device 102 or display device 104) is configured to perform the tasks of generating user multiple user interfaces, processing user input commands, and generating user interfaces in response to the commands, in alternative embodiments, some portion of these tasks can be performed by either the other device (e.g., touchscreen device 102, display device 104) or by other remote computing devices (e.g., remote servers).

Further, some or all of the processes 500 and 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

FIGS. 7-17B illustrate examples of user interfaces generated for display across a touch-enabled display of a touchscreen device (e.g., touchscreen device 102 of FIG. 1) and non-touch display of a display device (e.g., display device 104 of FIG. 1). As described, an application (e.g., application 235 of FIG. 2) can be stored and executed on at least one of a touchscreen device (e.g., tablet computer, smartphone) and a display device (e.g., desktop, monitor, laptop) and can generate and modify multiple user interfaces displayed across the devices based on user input. The user interfaces may be presented across the devices in a coordinated fashion. Content displayed in the each of the user interfaces may include different aspects the application, thereby facilitating interaction with the application. In some embodiments, the user interfaces may display different levels of information in the application.

Figure 7:
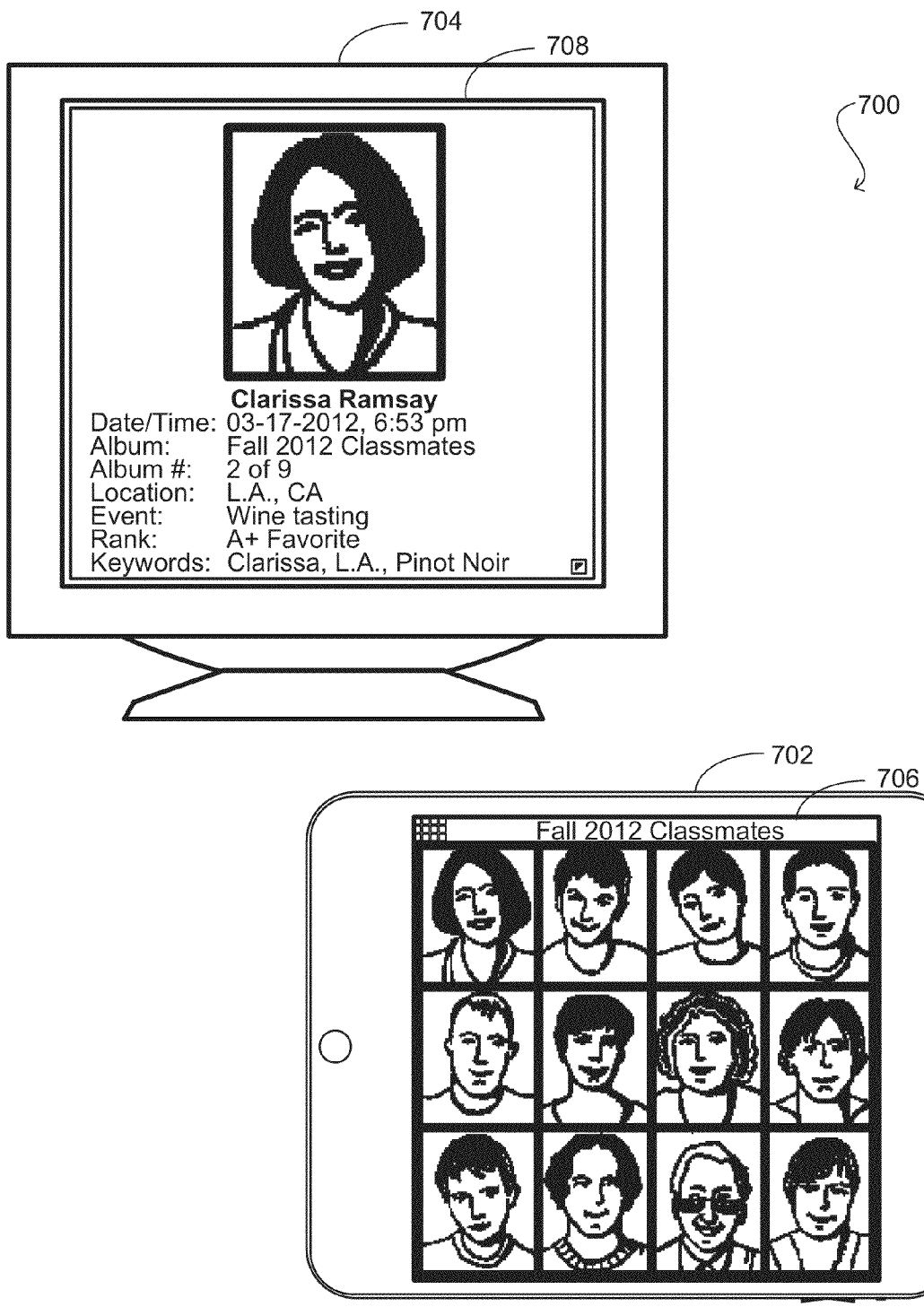

FIG. 7 illustrates an example 700 of how different levels of information can be displayed on a display device 704 and a touchscreen device 702 in accordance with some embodiments of the invention. In certain embodiments, application 235 of FIG. 2 can be a digital photograph manipulation application that is configured to generate a first user interface for presentation on touch-enabled display 706 and a second user interface for presentation on computer monitor 708. As shown in this example, the first user interface for presentation on touch-enabled display 706 includes a set of thumbnails, each representing a photo. The second user interface displays additional detailed information about a particular photo that has been selected by the user.

In this instance, the thumbnail representing a photo of Clarissa Ramsay has been selected, and the application has generated the second user interface for display on computer monitor 708. The second user interface includes an image represented by the thumbnail and information about the photo, the date/time when the photo was taken, the album name and number, the location, event, and additional information that application had captured when the photo was taken or that the user had recorded. The user may view the different thumbnails in a particular album, such as the "Fall 2012 Classmates" album and select to view the details of any of the thumbnails upon performing a selection through touch-enabled user interface of touchscreen device 702. In this instance, the user may select the thumbnails at random order for viewing on the larger computer monitor display 708, and need not scroll through the thumbnails in a particular order.

In some embodiments, in response to receiving a selection of the particular thumbnail, the application can generate the second user interface that includes an enlarged display of the image corresponding to the selected thumbnail. The second user interface may be displayed on computer monitor 704 without additional information. In this instance, the user of touchscreen device 702 can view the set of thumbnails (or list of files including a filename and/or an icon with an image) on touchscreen device 702 while spontaneously selecting images for viewing on computer monitor 704 in a randomized order. This allows the user to present a slideshow customized to the current audience without pre-defining the order of the slideshow. In some embodiments, upon selecting the particular thumbnail, computer monitor 704 may display the detailed information related to the particular thumbnail and not the photo represented by the thumbnail. Different embodiments may generate different user interfaces for display across the devices in a manner that is intuitive to the user.

FIG. 8 illustrates another example 800 of how different levels of information can be displayed on a display device 804 and a touchscreen device 802 in accordance with some embodiments of the invention. In this example, at least one of display device 804 and touchscreen device 802 is running a video game application. The video game application generates a user interface including video game scenes for display on display device 804. The video game application further generates another user interface including a set of control elements for display on touchscreen device 802.

Through a touch-enabled display 806 of touchscreen device 802, the user can select various control elements to control the movement and actions of the player. In this example, when the user selects a particular control element (e.g., a firing control), the player in the video game application performs a firing action, which can be seen in the user interface generated for display on display device 804. In response to receiving a user input via touch-enabled display of touchscreen device 802, the video game application generates another user interface for display on a non-touch display 808 of display device 804 that is determined based on the user interaction with the user interface displayed on touchscreen device 802.

While the gaming application in this example causes controls to be displayed on the touchscreen device and visual feedback to be displayed on the display device, a DJ application or an application that allows users to create music can also cause the controls to be displayed on the touchscreen device while album art or a music score is displayed on the display device. For instance, the DJ application can display a set of controls including a selectable surface of a drum, piano keyboard, etc. to be displayed on the touchscreen device. The user may then create music or cause album art or visualizer to be displayed on the display device by performing a series of user interaction with the set of controls.

Figure 9:
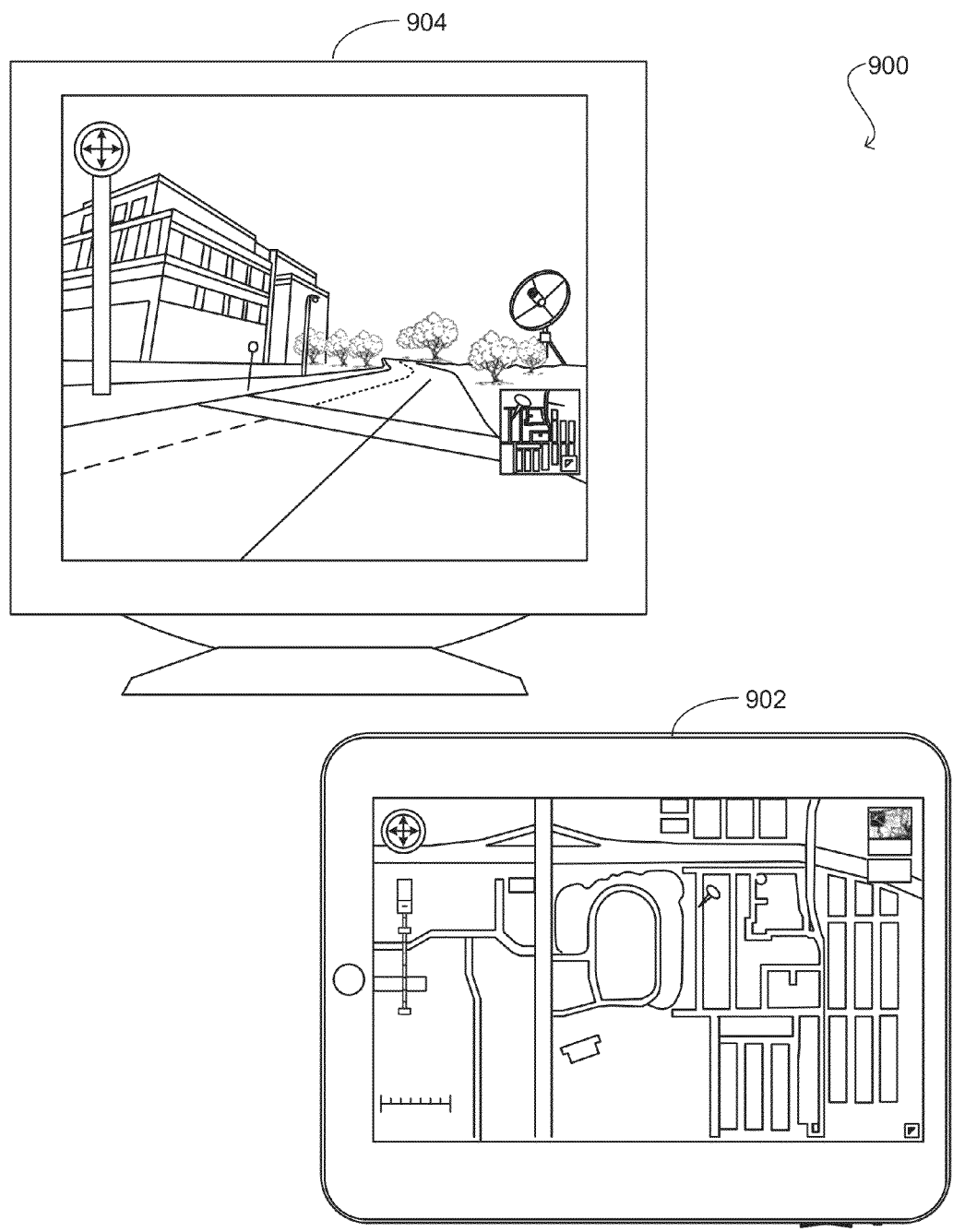

FIG. 9 illustrates another example 900 of how different levels of information can be displayed on a display device 904 and a touchscreen device 902 in accordance with some embodiments of the invention. In this example, a map application is being executed on at least one of display device 904 and touchscreen device 902. The map application can generate views of different perspectives and for different levels of detail of a particular map area on devices 902 and 904 in response to a user command. As shown in this example, touchscreen device 902 shows a bird's eye view of a map area while display device 904 shows a street level perspective view of a particular location within the map area.

In some embodiments, touchscreen device 902 may further display a set of selectable controls that the user can select to indicate the direction of the street view to display on display device 904. Additional levels of mapping information can be provided by the user interface displayed on display device 904 as well, including a list of stores, restaurants, and gas stations around a particular area indicated by the user (e.g., via a selection of a particular location on the map on the user interface displayed on touchscreen device 902), or other types of information that can be provided about the particular location.

FIG. 10 illustrates another example 1000 of how different levels of information can be displayed on a display device 1004 and a touchscreen device 1002 in accordance with some embodiments of the invention. In this example, a video conference application is running on display device 1004. The application generates a first user interface including a video image of the local user for display on touchscreen device 1002. The application further generates a second user interface including a video image of another participant (or multiple other participants) with whom the user is having the conference for display on display device 1004. By presenting an arrangement of the video images that would be intuitive to a user (e.g., where the user's local video is shown on touchscreen device 1002 and the remote participant's feed is viewable through electronic device 1004), the application can provide the user a better user experience in using the application.

In some embodiments, a number of control elements 1006 (e.g., menus, slider bars, text fields, and buttons representing volume adjustments, lighting adjustments, focus adjustments, and/or zoom adjustments functionality) can be displayed on touchscreen device 1002 such that the user may make adjustments when desired by performing a user input through the touch-enabled display of touchscreen device 1002. As such, the remote video need not be obstructed by control elements. Controls 1006 may also fade out in some embodiments when the user has not interacted with the touch-enabled display beyond a threshold period of time (e.g., after 5 seconds), thereby increasing the screen real estate for the user's video image.

FIG. 11 illustrates another example 1100 of how different levels of information can be displayed on a display device 1104 and a touchscreen device 1102 in accordance with some embodiments of the invention. In this example, a presentation application is running on touchscreen device 1102. The presentation application generates a first user interface 1106 including a series of presentation slides 1108 that are in a file, a set of controls 1110, and an image of a slide 1112 that is currently selected by the user for display on touchscreen device 1102. The presentation application further generates a second user interface 1114 including a mirror image of the selected slide for display on display device 1104.

Through the touch-enabled display of touchscreen device 1102, the user can perform a set of actions while giving the presentation, such as selecting text or items within the slide currently being displayed, highlighting or circling portions of the slide (currently shown), or writing on the slide. In response to receiving the user input, the presentation application can generate a partial mirror image of the user interface being displayed on touchscreen device 1102 for display on display device 1104. The partial mirror image 1114 can include the slide currently selected for display on touchscreen device 1102 and the user input (i.e., a portion being circled) being performed on the slide.

In some embodiments, the presentation application can allow users to create and edit presentations. In response to user indication that the user would like to edit a presentation slide, the application can cause the big screen or display device 1104 to display the full slide and cause touchscreen device 1102 to display a close-up of the portion the user is currently editing. A set of editing tools and a virtual keyboard may also be displayed on touchscreen device 1102 in addition to the close-up of the portion that the user is currently editing.

FIG. 12 illustrates another example 1200 of how different levels of information can be displayed on a display device 1204 and a touchscreen device 1202 in accordance with some embodiments of the invention. In this example, a media player application is running on touchscreen device 1202. The media player application generates a first user interface 1206 including a set of music albums 1208 that are viewable and selectable by the user on touchscreen device 1202. The media player further generates a second user interface 1210 including detailed information about one of the music albums selected by the user (as shown by highlighted box 1205) for display on display device 1204. As shown in this example, a set of information items 1212 (i.e., lower level of information) are displayed on display device 1204, including album art, information about the artist, a list of songs included in the selected album, and characteristics related to each song, including a length of the song.

Through the touch-enabled display of touchscreen device 1202, the user can randomly select from album to album from the displayed set on display device 1204 to view the details under each album. In response to receiving the user input, the media player application can generate second user interface 1210 including detailed information or a lower level of information of the selected item. As such, the user may maintain a view of all the available albums while being able to view the details of a selected album at the same time.

Figure 13:
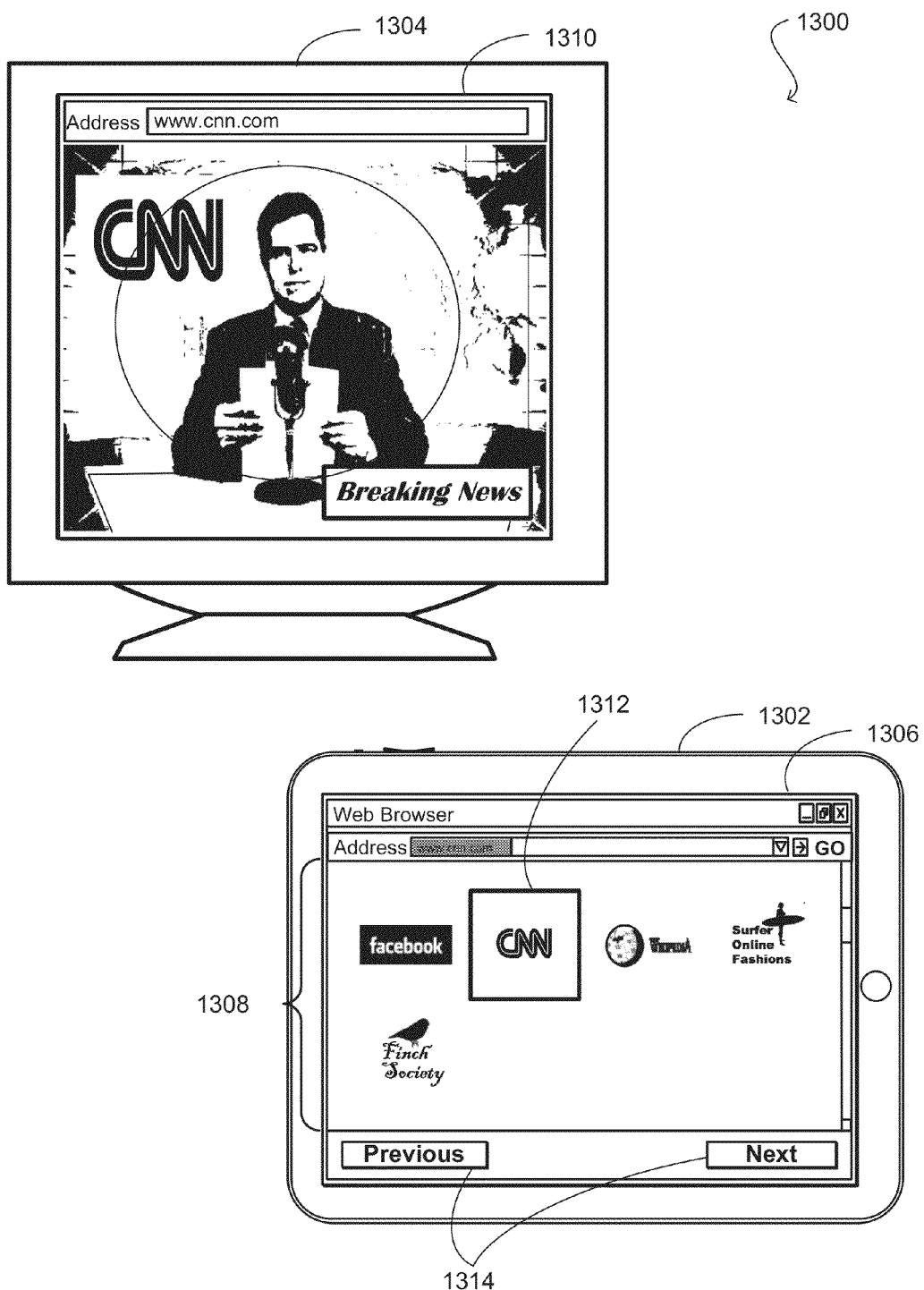

FIG. 13 illustrates another example 1300 of how different levels of information can be displayed on a display device 1304 and a touchscreen device 1302 in accordance with some embodiments of the invention. In this example, a browser application is running on touchscreen device 1302. As described above, the browser application can be running on either touchscreen device 1302 or display device 1304. The browser application can generate a first user interface 1306 on touchscreen device 1302 that includes a list of the user's bookmarked websites or favorite websites 1308. The browser application can also generate a second user interface 1310 including the contents of a selected website (i.e., lower level details of an information item) for display on display device 1304. In some embodiments, this may include an article, a multimedia item such as a video file, or any other objects that may be included in a webpage. In this example, the content of a selected website (i.e., a video broadcast of a news station) is a lower level of information related to the selected website.

Through the touch-enabled display of touchscreen device 1302, the user can launch a browser application and identify sites that the user would like to visit. The browser application may display a set of the user's favorite website or bookmarked websites on device 1302 upon launching the application and allow the user to select a website to be displayed on display device 1304. In response to receiving the user input, the browser application can cause display device 1304 to load and display the website corresponding to the selected link 1312. A set of control buttons 1314 may also be displayed on touchscreen device 1302 to enable the user to request to return to the previous website or to the next website. Further, in response to receiving a user selection of another website in the bookmarked websites, touchscreen device 1302 may cause display device 1304 to load and display contents of the other website. As such, the different images generated and displayed on the devices 1302 and 1304 are interactive and responsive to user input to touchscreen device 1302.

Figure 14:
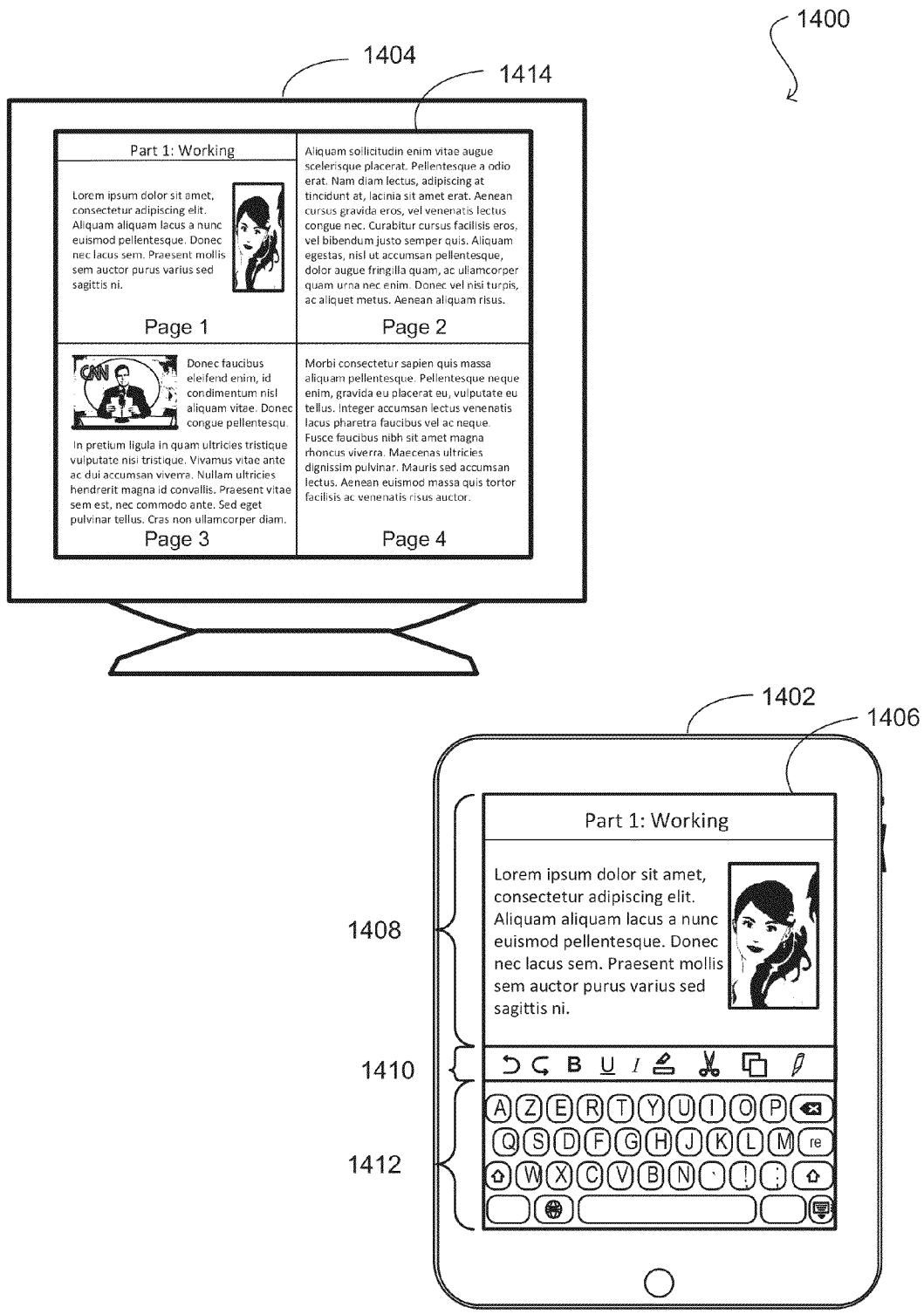

FIG. 14 illustrates another example 1400 of how different levels of information can be displayed on a display device 1404 and a touchscreen device 1402 in accordance with some embodiments of the invention. In this example, a page layout application (also referred to as word processing application) is running on touchscreen device 1402. As described above, the page layout application can be running on either touchscreen device 1402 or display device 1404. The page layout application can generate a first user interface 1406 including an editable region 1408, a set of editing tools 1410, and a virtual keyboard 1412 for display on touchscreen device 1402. The page layout application can also generate a second user interface 1414 including a set of pages included within a document/file for display on display device 1404. Editable region 1408 can include a subset of the pages included within the document. In this example, editable region 1408 includes a single page from the set of pages being displayed on display device 1404.

Through the touch-enabled display of touchscreen device 1402, the user can select a portion of the document that the user would like to focus on editing. The page layout application can provide a set of editing tools 1410 that the user may select and use to edit the portion of the document that is being displayed in editable region 1408. The user may also perform character input using virtual keyboard 1412 displayed on touchscreen device 1402. While the user is editing a portion of the document, the user may view the entire document or multiple pages of the document on display device 1404. By displaying a higher level of information (or by zooming out such that multiple pages of the document are viewable by the user, the user can see the big picture as to what is included in the document and how the document look as a whole, while the user edits a portion of the document. In some embodiments, the user's edits in touchscreen device 1402 may be reflected on display device 1404 in real-time or in response to user edits.

While in this example the document includes multiple pages, in some embodiments only a single page is included in the document (e.g., a poster page, a postcard). In some embodiments, the user may be editing a portion of a page (e.g., half a page, a quarter of a page) on touchscreen device 1402 while the entirety of the page is displayed on display device 1404. As such, the user may perform edits to portions of the page on touchscreen device while simultaneously viewing how the edits are reflected on the page when the entire page is in view on display device 1404.

Figure 15:
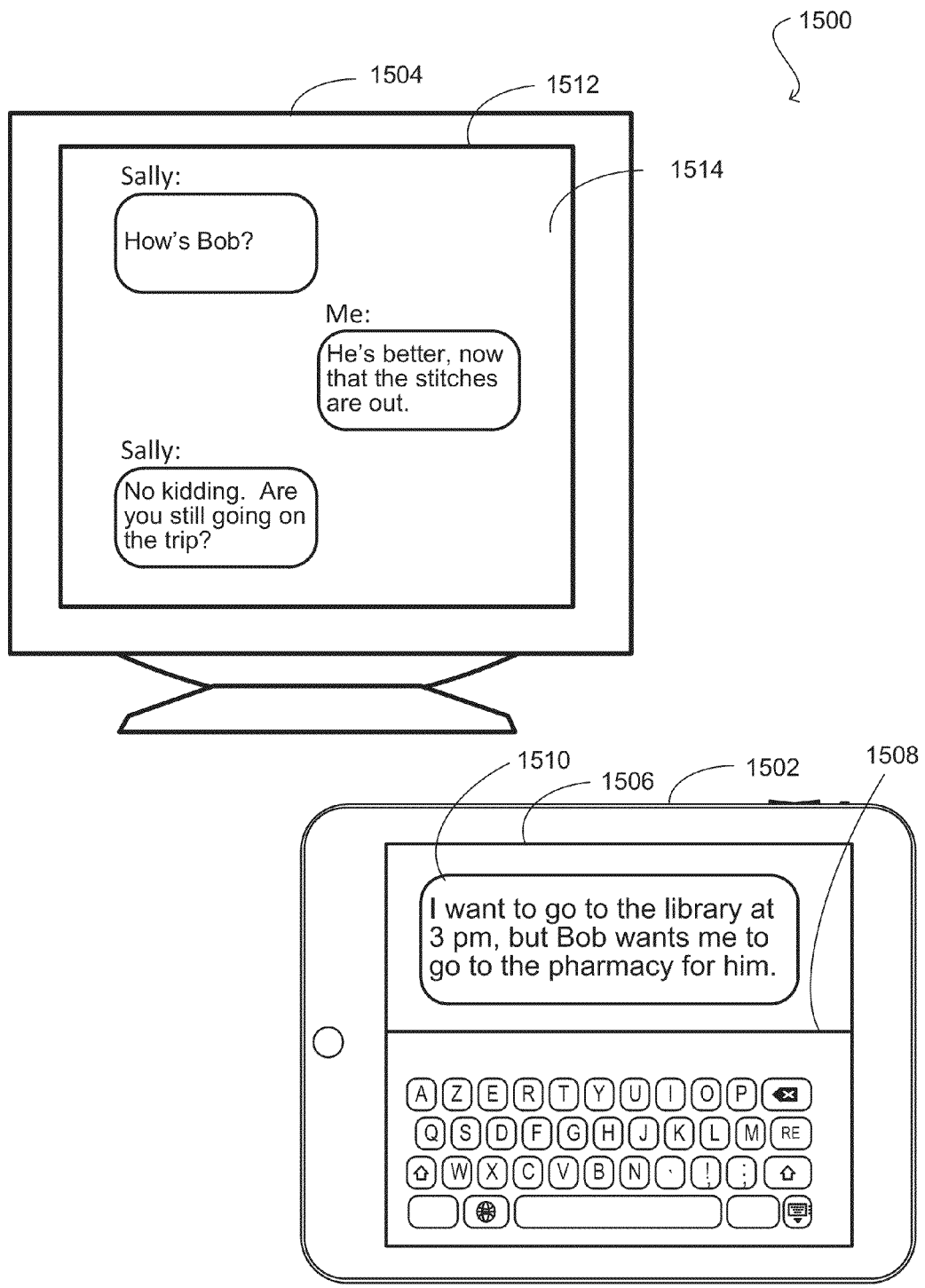

FIG. 15 illustrates another example 1500 of how different levels of information can be displayed on a display device 1504 and a touchscreen device 1502 in accordance with some embodiments of the invention. In this example, a messaging application (e.g., an instant messaging app) is running on touchscreen device 1502. As described above, the messaging application can be running on either touchscreen device 1502 or display device 1504. The messaging application can generate a first user interface 1506 including a virtual keyboard 1508 and a text entry box 1510 where the user may enter a message to send to a recipient. The messaging application can also generate a second user interface 1512 including a communication exchange 1514 between the user and the recipient. In this example, the communication exchange between the user and the recipient is a higher level of information relative to the user's entered message.

Through the touch-enabled display of touchscreen device 1502, the user can compose messages using virtual keyboard 1508 and view the entered text simultaneously through the same display on touchscreen device 1502. In response to receiving the user input to send a message to a recipient (or receiving a message from a recipient), the messaging application may cause display device 1504 to update the communication exchange. As the communication exchange is constantly updated and displayed on display device 1504, the user may have a more comprehensive view of the communication exchange on a larger display of display device 1504. In this example, a higher level of information (i.e., content of the conversation exchange) is displayed on the larger display of the display device while a lower level of information (i.e., the user's message) and control elements including virtual keyboard 1508 are displayed on the touchscreen device. Different combination may also be available in different embodiments.

Figure 16A:
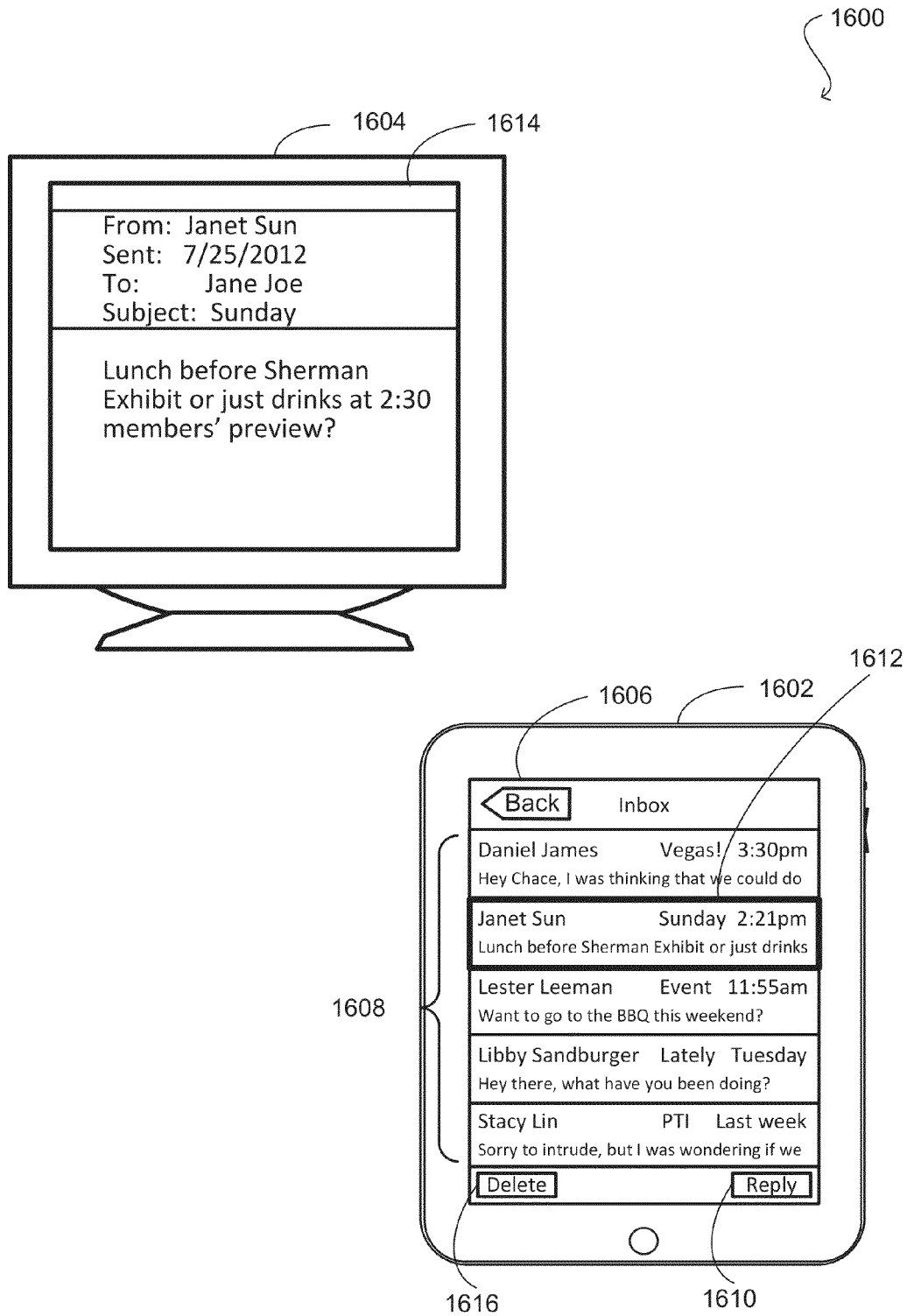
Figure 16B:
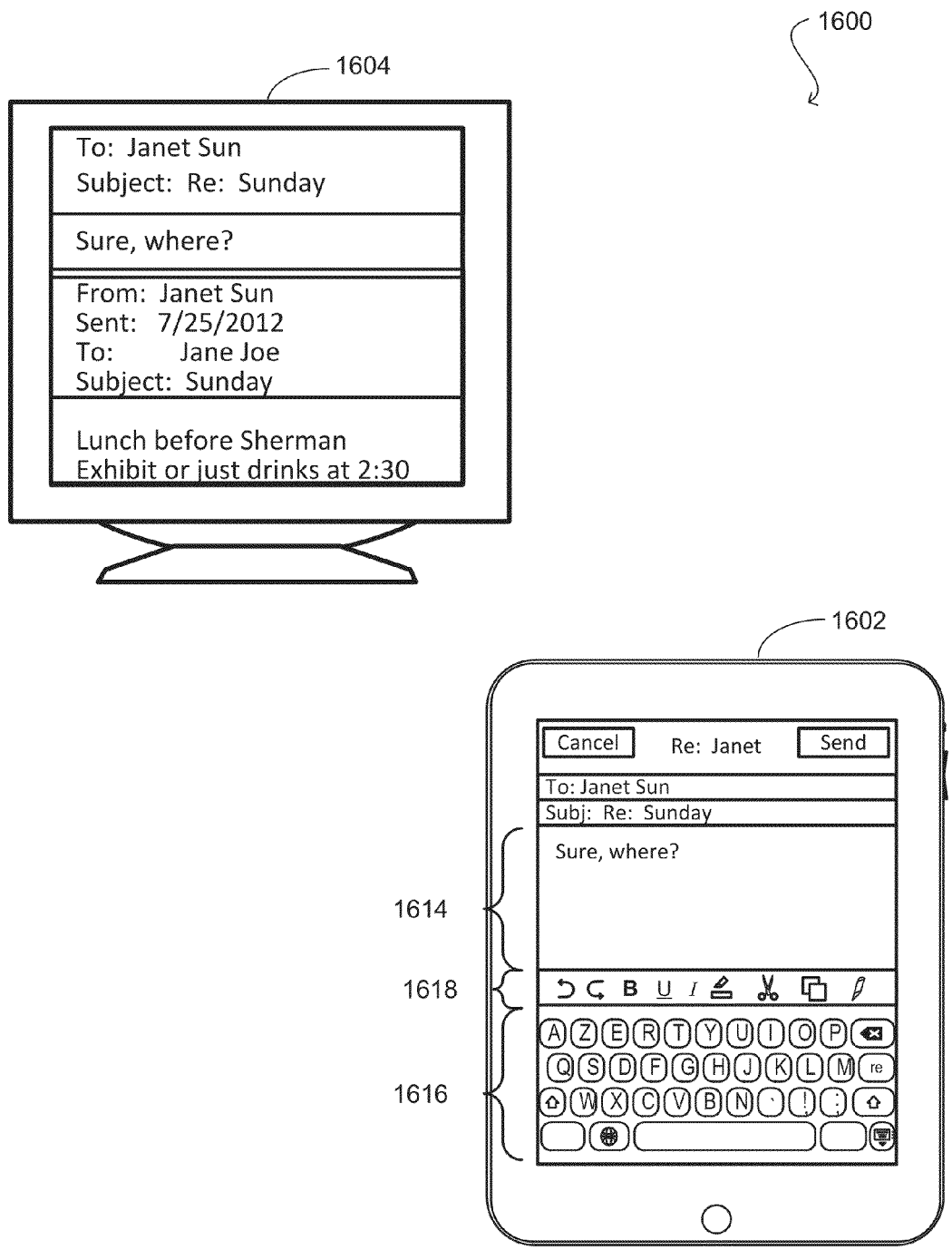

FIGS. 16A-16B illustrate another example 1600 of how different levels of information can be displayed on a display device 1604 and a touchscreen device 1602 in accordance with some embodiments of the invention. In response to user interaction with touchscreen device 1602, different levels of information can be generated for each device and displayed to a user in an intuitive manner. In this example, an e-mail application can be running on either touchscreen device 1602 or display device 1604. The e-mail application can generate a first user interface 1606 including a list of e-mail messages 1608 in the user's inbox including sender information, a subject of each e-mail, and a portion of the content of each e-mail. The e-mail application may further generate a second user interface 1614 that includes a larger version (or zoomed-in version) of the contents of a selected e-mail 1612. In this example, the contents of the e-mail message displayed on display device 1604 represents a "lower level of information" as first user interface 1606 includes the list of the e-mail messages 1608 and various control elements 1616 in addition to the contents of selected e-mail 1612.

Through the touch-enabled display of touchscreen device 1602, the user can navigate through the list of e-mails and select a preview of an e-mail in e-mail viewing pane 1608. In response to receiving a user selection of a particular e-mail 1612 for viewing, the e-mail application may cause display device 1604 to display the contents of email 1612. As such, the user may view the contents of different e-mails by selecting the e-mails in the list (in a non-sequential order or in order). While FIG. 16A illustrates the one combination of the different levels of information that can be displayed on device 1602 and 1604 in response to user interaction with touchscreen device 1602, FIG. 16B illustrates that in response to different user input, the e-mail application may generate another level of information for display on display device 1604. That is, the user interface displayed on each device can be interactive and responsive to the user input.

In FIG. 16B, the user begins typing a response to the selected e-mail (after hitting reply key 1610 shown in FIG. 16A). As shown in this example, the reply message that is being typed by the user (in text box 1614) is simultaneously displayed on display device 1604 such that the user may view the totality of the chain message (including the response and the e-mail that is being responded to) while the user types the message using a virtual keyboard 1616 and editing/formatting tools 1618 (e.g., font, size, color, etc.) displayed on touchscreen device 1602. In this example, a higher level of information (i.e., content of the chain e-mail) is displayed on the larger display of the display device while a lower level of information (i.e., the user's response) and various control elements including a virtual keyboard are displayed on the touchscreen device.

While in FIG. 16A, the e-mail application causes touchscreen device 1602 to display a list of e-mails and display device 1604 to display contents of a selected e-mail and in FIG. 16B, the e-mail application causes touchscreen device 1602 to display a response message and various selectable elements usable to create the response message and display device 1604 to display a comprehensive overview of the e-mail chain, in some embodiments, the e-mail application can cause one of touchscreen device 1602 and display device 1604 to display an e-mail message while the other (e.g., display device 1604) displays the content of one or more attachments to the e-mail. In the instance where touchscreen device 1602 displays the e-mail message while display device 1604 displays an attachment to the e-mail, the user may type a reply message displayed on touchscreen device 1602 while viewing one or more of the attachments on display device 1604.

Figure 17A:
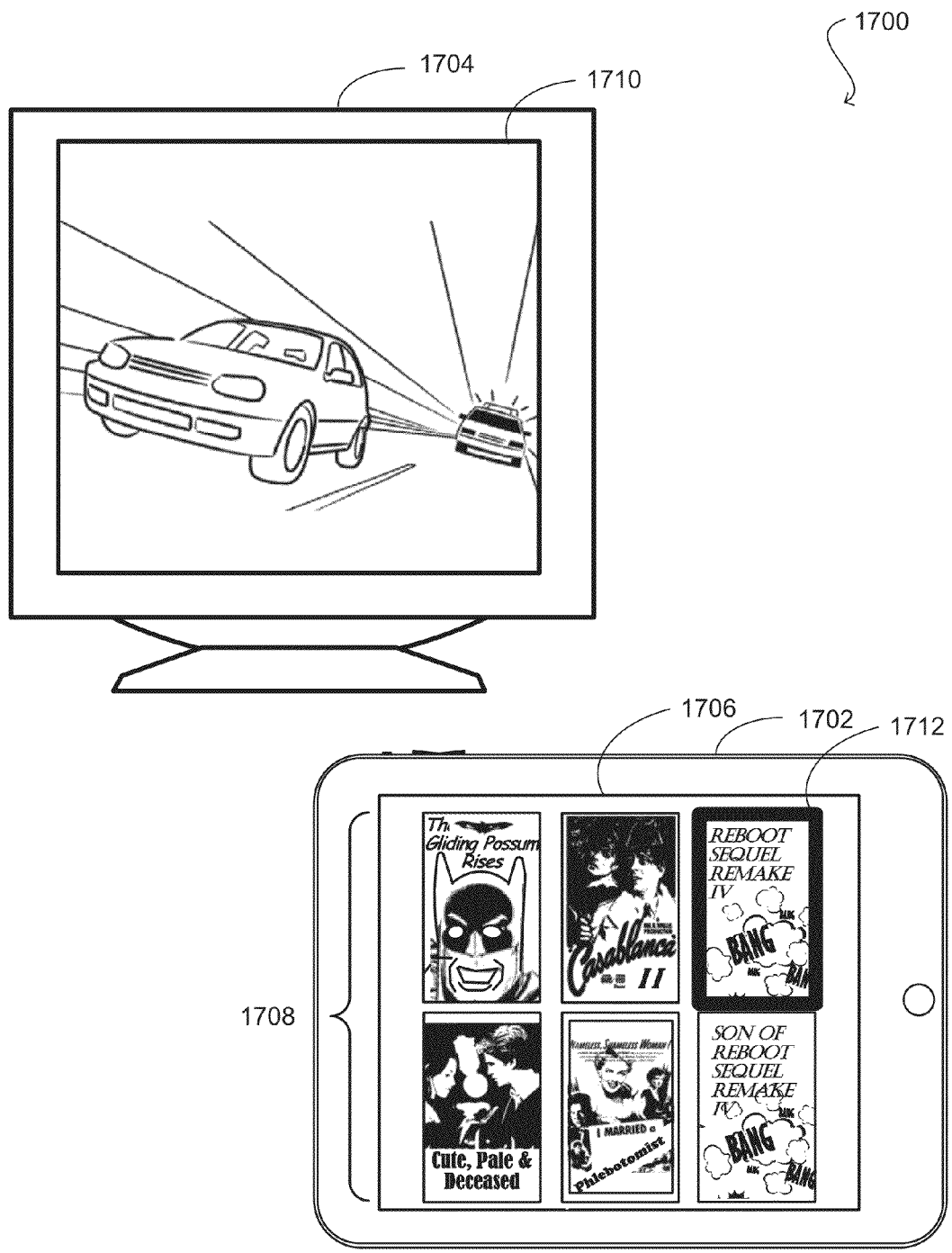
Figure 17B:
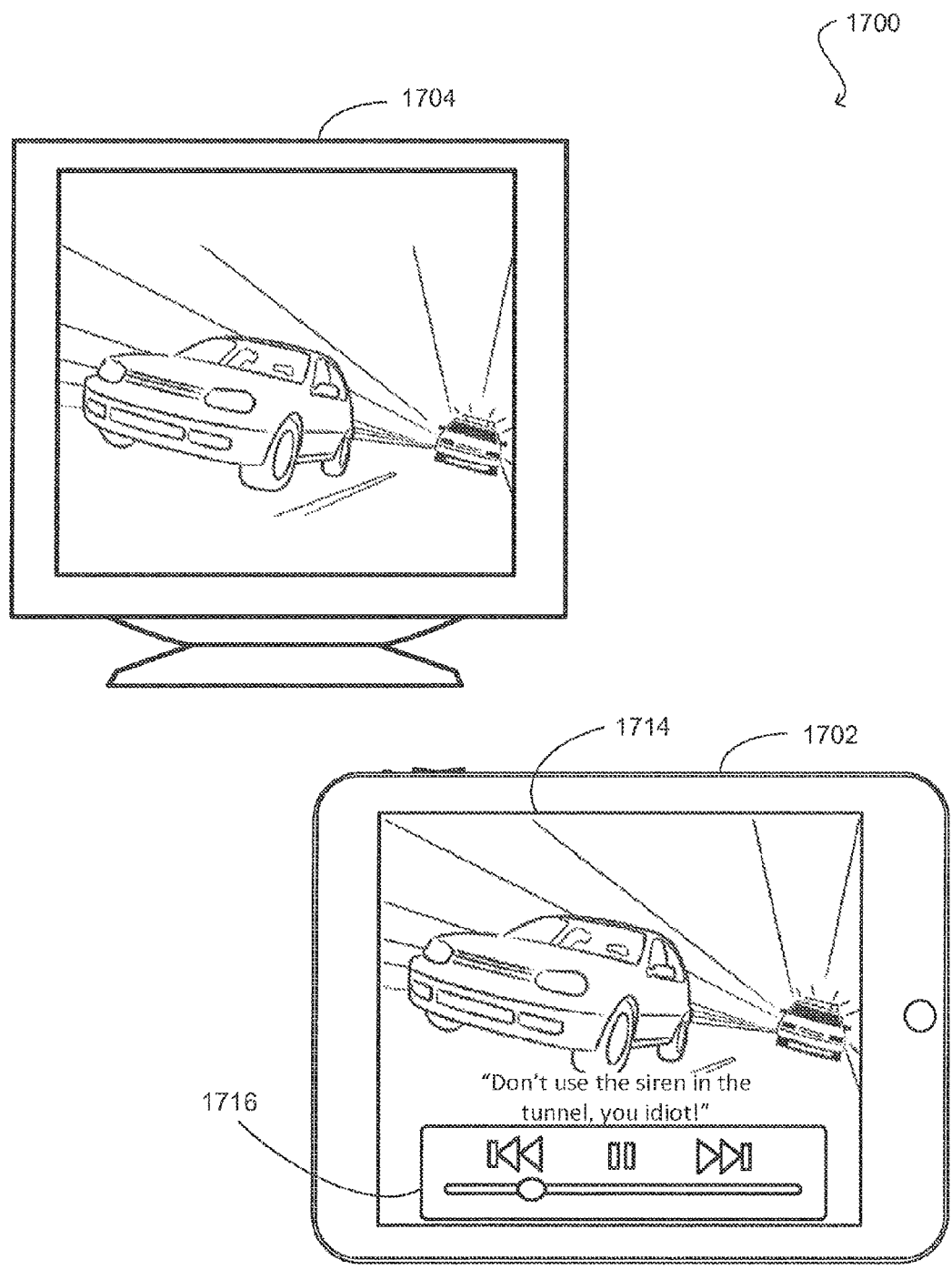

FIGS. 17A-17B illustrate another example 1700 of how different levels of information can be displayed on a display device 1704 and a touchscreen device 1702 in accordance with some embodiments of the invention. In this example, a movie player application (or video editing application) can be running on either touchscreen device 1702 or display device 1704. The movie player application can generate a first user interface 1706 including a set of movie thumbnails 1708 representing the user's movie collection. The movie player application may further generate a second user interface 1710 that plays the contents of a selected movie 1712. In this example, the content of the video or movie displayed on display device 1704 represents a "lower level of information."

Through the touch-enabled display of touchscreen device 1702, the user can navigate through the videos/movie thumbnails displayed on touchscreen device 1702 and select a preview of a movie in display device 1704. In response to receiving a user selection of a particular movie 1712 to preview or to play, the movie player application may cause display device 1704 to display the contents of movie 1712. As such, the user may view the contents of different movies as the user selects different videos in the list (in a non-sequential order or in order).

FIG. 17B illustrates that after the movie begins (e.g., after a certain amount of time or after the user has indicated that the user would like to watch the selected movie), the movie player application may generate another user interface 1714 for display on touchscreen device 1702. In this example, touchscreen device 1702 also displays the movie being displayed on display device 1704. However, touchscreen device 1702 also displays a set of controls 1716 (e.g., fast forward, pause, rewind, etc.) such that the user may control the movie being played on devices 1702 and 1704. Additional controls such as a selectable play button, a stop button, next/previous track buttons, an adjustable knob that the user can select and scroll to change the scene currently displayed on the display device, etc. may also be displayed in some embodiments. In some embodiments, the set of controls 1716 may not be readily displayed and may appear in response to a user input (e.g., a tap on touchscreen device 1702). In response to different user input (e.g., control signals), the movie player application may modify the information displayed on display device 1704 (and touchscreen device 1702). That is, the user interface displayed on each device can be interactive and responsive to the user input.

Further, the user may configure touchscreen device 1702 to display closed captioning or subtitles such that the user may have supplemental information to the movie accessible if the user so desires. This permits viewers who prefer not to see the captions to not have to be forced to watch the movie with captions displayed on the display device. As such, the application may generate a number of user interfaces that would be intuitive for the user's use of multiple display screens. The application can display the generated user interfaces in a display arrangement (e.g., which user interface for which device) in a way that maximizes use of the multiple screens (a large screen and a smaller touchscreen).

It should be appreciated that FIGS. 7-17B are illustrative and not intended to limit embodiments of the present invention. For example, although an application is shown as generating two different user interfaces in each figure, any number of such user interfaces can be generated. In another example, although a touch device and a non-touch device are used in the examples, any electronic device can be used regardless of whether the device is a touch device or a non-touch device. One of ordinary skill in the art will recognize other variations, modification, and alternatives. Further, although particular examples of applications and user interfaces generated by such applications are described above, other applications may be used to generate user interfaces that can be displayed across multiple displays in an intuitive manner.

In some embodiments, the device running the application can cause another device (e.g., a computer desktop, a tablet computer) to display a set of information items by providing a structured data file (e.g., an eXtensible Markup Language (XML) file) to the other device, and the other device (i.e., the device not running the application) can run an application-specific interpreter to render an image including the set of information items. In some embodiments, the device running the application can cause the other device to display the set of information items by providing a pixel stream or pixel data (e.g., in digital or analog form) to the other device, which then renders an image. For example, when the other device is a monitor, a controller of the monitor may read the pixel data and display an image based on the pixel data.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of presenting information, the method comprising:
   establishing a connection, by a first electronic device having a touch-enabled display, with a second electronic device having a second display;
   causing application content for a communication session, including at least part of multiple communication messages, to be presented on the second display of the second electronic device;
   presenting a first set of information items on the touch-enabled display of the first electronic device, the first set of information items being navigable and selectable by a user of the first electronic device, the first set of information items including editable content to be part of the communication session and a plurality of editing tools, wherein the first set of information items are distinct and different from the application content;
   receiving, from the user via the touch-enabled display of the first electronic device, a request to edit the editable content using the plurality of editing tools;
   in response to receiving the request to edit the editable content, generating a new communication message from the editable content; and
   enabling a second set of information items including the application content along with the new communication message to be presented on the second display of the second electronic device while the first set of information items is presented on the touch-enabled display of the first electronic device.

2. The method of claim 1, wherein the first set of information items and the second set of information items are associated with a single application program.

3. The method of claim 1, wherein the first electronic device is a tablet computing device and the second electronic device is a desktop computer.

4. The method of claim 1, wherein the plurality of editing tools includes a virtual keyboard and wherein the editable content includes an instant message that is being constructed by the user of the first electronic device.

5. The method of claim 1, wherein the second set of information items is stored locally on the first electronic device and transmitted from the first electronic device.

6. The method of claim 1, further comprising:
   sending the new communication message, thereby enabling the new communication message to be displayed on the second display of the second electronic device as part of the communication session.

7. An electronic device, comprising:
   a processor;
   a touch-enabled display;
   a memory device coupled to the processor, the memory device including instructions to be executed for presenting information, wherein the instructions, when executed by the processor, cause the processor to:
   cause application content for a communication session, including at least part of multiple communication messages, to be presented on another display of another electronic device;
   present a first set of information items on the touch-enabled display of the electronic device, the first set of information items being navigable and selectable by a user of the electronic device, the first set of information items including editable content to be part of the communication session and a plurality of editing tools, wherein the first set of information items are distinct and different from the application content;
   receive a request to edit the editable content using the plurality of editing tools;
   in response to receiving the request to edit the editable content, generate a new communication message from the editable content; and,
   cause a second set of information items including the application content along with the new communication message to be presented on the other display of the other electronic device while the first set of information items is presented on the touch-enabled display of the electronic device.

8. The electronic device of claim 7, wherein the electronic device and the other electronic device are communicatively coupled via a wireless network.

9. The electronic device of claim 7, wherein the first and second sets of information items are stored locally on the electronic device.

10. The electronic device of claim 7, wherein the plurality of editing tools includes a virtual keyboard and wherein the editable content includes a communication message that is being constructed by the user of the electronic device.

11. The electronic device of claim 10, wherein the instructions further cause the processor to:
- receive a user indication for composing the message, wherein the plurality of editing tools are presented in response to receiving the user indication for composing the message,
- the plurality of editing tools being capable of receiving character input in a portion of the touch-enabled display;
- receive user input specifying a set of characters; and
- in response to receiving the user input, display the set of characters on the touch-enabled display of the electronic device, wherein the editable content includes the set of characters.

12. A non-transitory computer readable storage medium storing one or more programs, the one or more programs comprising instructions, which when executed by an electronic device with a touch-enabled display, cause the device to:
- cause application content for a communication session, including at least part of multiple communication messages, to be presented on another display of another electronic device;
- present a first set of information items on the touch-enabled display of the electronic device, the first set of information items being navigable and selectable by a user of the electronic device, the first set of information items including editable content to be part of the communication session and a plurality of editing tools, wherein the first set of information items are distinct and different from the application content;
- receive a request to edit the editable content using the plurality of editing tools;
- in response to receiving the request to edit the editable content, generate a new communication message from the editable content; and,
- cause a second set of information items including the application content along with the new communication message to be presented on the other display of the other electronic device while the first set of information items is presented on the touch-enabled display of the electronic device.

13. The computer readable storage medium of claim 12, wherein the first set of information items and the second set of information items are associated with a single application program.

14. The computer readable storage medium of claim 13, wherein the single application program running on the electronic device generates a first user interface and a second user interface, the first user interface presents the first set of information items on the touch-enabled display of the electronic device and the second user interface presents the second set of information items on the other display of the other electronic device.

15. The computer readable storage medium of claim 12, wherein the electronic device is a tablet computing device and the other electronic device is a desktop computer.

16. The computer readable storage medium of claim 12, wherein the second set of information items is stored locally on the electronic device and transmitted from the electronic device.

17. The computer readable storage medium of claim 12, including instructions which, when executed, cause the device to:
- send the new communication message, thereby enabling the new communication message to be displayed on the other display of the other electronic device as part of the communication session.

18. The computer readable storage medium of claim 12, wherein the first and second sets of information items are stored locally on the electronic device.

19. The computer readable storage medium of claim 12, wherein the plurality of editing tools include a virtual keyboard and wherein the editable content includes a communication message that is being constructed by the user of the electronic device.

20. The computer readable storage medium of claim 19, including instructions which, when executed, cause the device to:
- receive a user indication for composing the message, wherein the plurality of editing tools are presented in response to receiving the user indication for composing the message,
- the plurality of editing tools being capable of receiving character input in a portion of the touch-enabled display;
- receive user input specifying a set of characters; and
- in response to receiving the user input, display the set of characters on the touch-enabled display of the electronic device, wherein the editable content includes the set of characters.

* * * * *